United States Patent
Karaki et al.

(10) Patent No.: US 6,906,858 B2
(45) Date of Patent: Jun. 14, 2005

(54) MICROSCOPE PROVIDED WITH AN OBJECTIVE LENS FOCUSING APPARATUS AND AN OBJECTIVE LENS SWITCHING APPARATUS

(75) Inventors: Kenji Karaki, Ina (JP); Kazuhiro Hasegawa, Hachioji (JP); Keisuke Tamura, Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 658 days.

(21) Appl. No.: 09/906,269

(22) Filed: Jul. 16, 2001

(65) Prior Publication Data
US 2002/0036822 A1 Mar. 28, 2002

(30) Foreign Application Priority Data
Jul. 17, 2000 (JP) ........................................ 2000-216190
Nov. 2, 2000 (JP) ........................................ 2000-336170

(51) Int. Cl.[7] ........................... G02B 21/00; G02B 21/26
(52) U.S. Cl. ....................... 359/383; 359/368; 359/392
(58) Field of Search .................................. 359/368–390, 359/694–706; 250/201.03, 201.3

(56) References Cited
U.S. PATENT DOCUMENTS 2,360,268 A * 10/1944 Ott .............................. 359/382
4,676,608 A * 6/1987 Faubion ....................... 359/383
4,712,890 A * 12/1987 Dobner ........................ 359/392
5,270,855 A * 12/1993 Hasegawa .................... 359/368
6,094,299 A * 7/2000 Schau et al. ................. 359/383
6,337,766 B1 * 1/2002 Fujino .......................... 359/383
6,437,911 B1 * 8/2002 Hasegawa .................... 359/381

FOREIGN PATENT DOCUMENTS
JP 6-40910 5/1994
JP 06-222276 A 8/1994

* cited by examiner

Primary Examiner—Thong Q Nguyen
(74) Attorney, Agent, or Firm—Frishauf, Holtz, Goodman & Chick, P.C.

(57) ABSTRACT

A rough motion shaft 54 and a fine motion shaft 55 are provided on a front side of a stage 37 with respect to an optical axis of an observation optical system of a microscope. Further, a rough motion shaft 45 and a fine motion shaft 46 are provided on a rear side with respect to the optical axis. The rough motion shaft 54 and the fine motion shaft 55 are linked with the rough motion shaft 45 and the fine motion shaft 46 so as to move objective lenses 43 selectively in rough motion or fine motion. Objective lenses 43A, 43B are arranged in a circular shape on a fixing member 111 and a rotating member 113 rotates objective lenses 43A, 43B along the direction of the arrangement. The rotating member 113 includes a weight 123 that applies a rotation force in an inverse direction.

13 Claims, 15 Drawing Sheets

MICROSCOPE PROVIDED WITH AN OBJECTIVE LENS FOCUSING APPARATUS AND AN OBJECTIVE LENS SWITCHING APPARATUS

CROSS-REFERENCE TO RELATED APPLICATIONS

This application is based upon and claims the benefit of priority from the prior Japanese Patent Applications No. 2000-216190, filed Jul. 17, 2000; and No. 2000-336170, filed Nov. 2, 2000, the entire contents both of which are incorporated herein by reference.

BACKGROUND OF THE INVENTION

1. Field of the Invention

The present invention relates to improvement of a microscope provided with an objective lens focusing apparatus and an objective lens switching apparatus, and more particularly to improvement of an objective lens focusing apparatus which moves an objective lens or a stage in the microscope and an objective lens switching apparatus which is employed in the same microscope and provides such a function as magnification switching.

2. Description of the Related Art

Generally, the microscope includes an objective lens focusing apparatus for moving an objective lens to focus on a specimen and an objective lens switching apparatus for switching a plurality of the objective lenses to place one of them selectively on an observation optical axis.

As the focusing mechanism, there are two types, namely one type in which the objective lens is moved upward or downward (hereinafter referred to as up/down) along the optical axis and another type in which a stage supporting a specimen is moved up/down, in order to adjust a distance between the specimen and the objective lens or the stage. Generally, the focusing apparatus is provided with a rough motion handle and a fine motion handle. In this focusing apparatus, if the rough motion handle is rotated, a rotation of this rough motion handle is transmitted to a rough motion shaft, and further the rotation is transmitted to a pinion and rack and transformed to a vertical motion. Consequently, the objective lens is moved in rough motion in any one of the vertical directions along a guide.

If the fine operation handle is rotated, a rotation of the fine motion handle is decelerated by a reduction gear or the like and transmitted to the rough motion shaft. This rotation is transmitted to the pinion and rack gears and transformed to a vertical motion, so that the objective lens is moved in fine motion in any one of the vertical directions along the guide.

Therefore, even if the rough motion handle and the fine motion handle are rotated by the same rotation amount or by the same rotation number, the moving amount of the objective lens due to the operation of the rough motion handle is larger than the moving amount of the objective lens due to the operation of the fine motion handle. When the rough motion handle is operated, the objective lens is moved in rough motion, while when the fine motion handle is operated, the objective lens is moved in fine motion.

The rough/fine motion handle of the focusing apparatus is provided on a bottom side thereof, away from the front side or from the stage as viewed from an observer. The reason why the rough/fine motion handle is disposed in such a way is that a guide for moving the objective lens or the stage vertically is located at a rear side of the stage and the rough/fine motion handle is directly and mechanically coupled to the guide. Usually, an arm for holding the objective lens or the stage is fixed on this guide in a cantilever form.

If the rough/fine motion handle is disposed on the bottom side away from the stage as viewed from the front side of the microscope main body, in case where various devices are disposed around the stage to observe the specimen as seen in, for example, patch clamp method or in case where the eye position of the observer is raised depending on microscope system, the operability of the rough/fine motion handle is deteriorated considerably, which is a problem demanded to be solved.

An example of technology, which has improved the operability of the rough/fine motion handle, is a microscope focusing apparatus described in Jpn. Pat. Appln. KOKAI Publication No. 6-222276. FIG. 1 shows a microscope provided with this microscope focusing apparatus. The microscope shown in FIG. 1 includes a microscope frame 201 comprised of a horizontal arm portion 201A, a base portion 201B and a vertical portion 201C. A light source 202 is provided on the base portion 201B of the microscope frame 201 and the horizontal arm portion 201A has an objective lens 203, a lens tube 204 and an ocular lens 205.

A fixing base 206 is provided on the vertical portion 201C of the microscope frame 201 and a moving base 208 is provided on this fixing base 206 through a guide 207 such that it is movable vertically. A stage holder 209 is supported by this moving base 208 in a cantilever form. A stage 211 for supporting a specimen 210 is provided on this stage holder 209 and a condenser lens 212 is provided below it.

An operation handle 213 for moving the stage 211 vertically is supported rotatably on the base portion 201B, for example, of the microscope frame 201. This operation handle 213 has a transmission mechanism of the following structure. The operation handle 213 is connected to a longitudinal base 216 through a pinion gear 214 and a horizontal rack gear 215. This longitudinal base 216 is placed on a fixing plate 218 through a guide 217. A horizontal rack 219 is provided on the longitudinal base 216, with which an idler 220 meshes. This idler 220 is provided on the moving base 208 and meshes with a vertical rack 221.

Therefore, if the operation handle 213 is operated, a rotation of this operation handle 213 is transformed to a motion in the back and forth direction of the longitudinal base 216 through the pinion 214 and the horizontal rack 215, and the motion of this longitudinal base 216 is transformed to a vertical motion of the vertical rack 221 through the horizontal rack 219 and the idler 220. Because the moving base 208 is moved vertically for the reason, the stage 211 is moved vertically.

However, because in the above described microscope focusing apparatus, the longitudinal base 216 is connected to the operation handle 213 through the pinion 214 and the horizontal rack 215 and the horizontal rack 219 and the idler 220 mesh with this longitudinal base 216 while connected to the moving base 208 through the vertical rack 221, the structure of that transmission mechanism is complicated. Consequently, because there are a number of mechanical connecting portions, there is a fear that looseness may occur thereby transmission accuracy being not sufficient. Further, this transmission mechanism takes much time and labor for assembly and adjustment and induces an increased cost.

Further, an objective lens switching apparatus, in which one of plural objective lenses 305 is switched selectively onto the observation optical axis as shown in FIGS. 2 to 7 has been already known.

In a transmission illumination type optical microscope shown in FIG. 2, a revolver 306 holding plural objective lenses 305 as well as an ocular lens-barrel 304 are mounted on an end of the objective arm 303 which is arranged substantially in parallel to the stage 302 of the microscope main body 301. By rotating this revolver 306, one objective lens is switched selectively from plural objective lenses 305 onto the observation optical axis.

The revolver 306 shown in FIG. 2 comprises a revolver main body 306A shown in FIG. 3 and a turning ring 306B. Plural objective lenses 305 are held by the turning ring 306B along the circumference of the turning ring 306B. A pressing ring 307 is inserted on the side of the turning ring 306B between a peripheral portion of the revolver main body 306A and the turning ring 306B. This pressing ring 307 is fit to an outer edge portion of the revolver main body 306A through balls 308. Further, a ball 309 is held at the rotation center between the revolver main body 306A and the turning ring 306B and this ball 309 is pressed at a predetermined force by a pressing screw 310 driven from a rear side of the revolver main body 306A. Thus, the turning ring 306B is rotated smoothly without any swivel with respect to the revolver main body 306A via the balls 308, 309.

As shown in FIG. 4, the proximal end of a click spring 311 having a click ball 312 at a front end thereof is fixed on the revolver main body 306A. On the other hand, a click groove 313 is formed in the periphery portion of the turning ring 306B corresponding to a mounting position of the objective lens 305. If the turning ring 306B is rotated so that the objective lens 305 comes near the optical axis, the click ball 312 located at the front end of the click spring 311 drops into the click groove 313. As a result, the turning ring 306B is fixed without any swivel by the pressing force of the click spring 311, so that the objective lens 305 is positioned on the optical axis.

Recently, a manipulator has been combined with the optical microscope in order to not only observe a cell but also carry out various kinds of cell operations such as gripping, piercing, injection and cutting.

FIG. 5 shows schematically the microscope system using such a manipulator. As shown in FIG. 5, an objective lens 318 and a manipulator 319, held by the revolver 317, are disposed such that they are adjacent a specimen 316 placed on the stage 315 of the microscope main body 314. This microscope system enables not only to operate the manipulator 319 to the specimen 316 but also observe a specimen image through the objective lens 318. In this system, a controller 320 is connected to the manipulator 319 and rotations of dials 321A, 321B provided on this controller 320 are transformed to fine motion of the manipulator 319. Therefore, the manipulator 319 can be operated finely.

In case of changing the observation magnification of the specimen image in such a specimen observation, the revolver 317 is rotated so as to switch the objective lens 318. If it is intended to rotate the revolver 317 without any treatment upon this switching, there is generated such a problem that the manipulator becomes an obstacle, thereby disabling the revolver from being rotated or the objective lens 318 comes into contact with part of the manipulator 319 during the rotation of the revolver 317, so that a front end of the manipulator 319 deflects.

In the positioning mechanism shown in FIG. 4, at an engagement time when the click ball 312 drops into the click groove 313 in order to obtain a restoration force for positioning, a pressing force is applied from the click spring 311 to the click groove 313 in the turning ring 306B. Therefore, a relatively large impact occurs when the click ball 312 drops into the click groove 313 and the front end of the manipulator 319 is vibrated by this impact, so that the manipulator may be slipped out of a cell being handled.

From such a background, an objective lens replacing apparatus disclosed in Jpn. Pat. Appln. KOKAI Publication No. 6-40910 has been proposed conventionally.

In this apparatus, as shown in FIGS. 6 and 7, two objective lenses OB1, OB2 are installed on a lens switching member 331 movably in a circular shape along the direction of the arrangement. This lens switching member 331 is supported rotatably on a fixing member 332 with a ball 333 and ball receivers 334, 335. A positioning shaft 336 including multiple thread screw formed therein is driven into a screw hole formed in a side face of the lens switching member 331. This positioning shaft 336 is driven by operating the lever 337, so that a positioning ball 338B provided on a side face of the fixing member 332 is fit to a conical concave portion at a front end of the positioning shaft 336 so as to position the objective lens OB1. When replacing the objective lens, the driving of the positioning shaft 336 is loosened by operating the lever 337 to release the holding of the lens switching member 331 to the fixing member 332 with the positioning ball 338B. After that, the lens switching member 331 is rotated with the knob 339 so as to switch the objective lens OB1 to the objective lens OB2 and then, the positioning shaft 336 is driven again by operating the lever 337 to hold the positioning ball 338A. As a result, the objective lens OB2 is positioned.

Because the mechanism shown in FIG. 7 allows the objective lenses OB1, OB2 to move in a circular shape along the direction of the arrangement, an action upon the replacement of the objective lens and a space necessary for the replacement operation can be reduced, thereby making it possible to prevent the objective lenses OB1, OB2 from interfering with the manipulator and the like around the specimen. Further, the positioning of the lens switching member 331 is carried out not by using elasticity of a spring but by driving the positioning shaft 336, while release of the positioning can be carried out by only loosening the driving of the positioning shaft 336 without linkage with the rotation of the lens switching member 331. Thus, generation of vibration which may occur when moving the lens switching member 331 to replace the objective lens can be minimized to a possible extent.

The mechanism disclosed in the aforementioned Jpn. UM Appln. KOKAI Publication No. 6-40910 has such a problem that it is incapable of carrying out an accurate position setting due to a slight gap provided to drive the positioning shaft 336 although such an objective lens switching mechanism is demanded to execute a position setting in micron order. Then, although it can be considered to provide with a precision driving mechanism capable of eliminating such a gap, provision of a high precision driving mechanism enlarges the entire size of the positioning mechanism and increases the price of the apparatus.

Further, because upon the replacement of the objective lens, first, the driving of the positioning shaft 336 is loosened with the lever 337, the lens switching member 331 is rotated with a knob 339 to switch the objective lens and finally, the positioning shaft 336 is driven with the lever 337, it comes that the lever 337 and the knob 339 need to be operated at such two positions alternately, thereby leading to complicatedness in operation for objective lens replacement.

BRIEF SUMMARY OF THE INVENTION

An object of the present invention is to provide a focusing apparatus of a microscope capable of improving the operability with a simple structure.

Another object of the present invention is to provide an objective lens switching apparatus capable of not only obtaining a high precision position reproducibility but also carrying out switching of the objective lens easily.

Still another object of the present invention is to provide a microscope provided with an objective lens switching apparatus including a focusing apparatus capable of improving the operability and an objective lens switching apparatus capable of not only obtaining a high precision position reproducibility but also carrying out selection of the objective lens easily.

To achieve the above objects, according to an aspect of the present invention, there is provided a microscope having an observation side, comprising: a frame main body on which an observation optical system having an observation optical axis is fixed; a stage extended from the frame main body toward the observation side for carrying a specimen; first and second objective lenses for observing the specimen on the stage; an objective lens switching apparatus which holds the first and second objective lenses and switches selectively the objective lenses onto the observation optical axis, the objective lens switching apparatus including a fixing member, a rotating member provided rotatably on the fixing member, in which the first and second objective lenses are arranged in a circular shape and with a rotation center provided on the fixing member, the objective lenses are rotated along the direction of the arrangement around the rotation center so as to be selectively positioned on the observation optical axis, a first restricting member for restricting a rotation of the rotating member so as to maintain the first objective lens such that it is positioned on the observation optical axis; a second restricting member for restricting a rotation of the rotating member so as to maintain the second objective lens such that it is positioned on the observation optical axis; and an applying means for when the rotating member provided with the first and second objective lenses is rotated as a rotating body, applying a rotation force in an inverse direction larger than a rotation force generated in the rotation body to the rotating member depending on a rotation angle of the rotating member; a focusing mechanism for focusing one of the objective lenses on the specimen on the stage by moving one of the objective lens switching mechanism and the stage, the focusing mechanism including, a rough/fine motion focusing mechanism provided on the frame main body on an opposite side to the observation side with respect to the optical axis for moving selectively one of the objective lens and the stage in rough/fine motion and provided with a first rough motion handle for moving the rough/fine motion focusing mechanism in rough motion and a first fine motion handle for moving in fine motion; and a rough/fine motion focusing operation portion provided on the frame main body on the observation side with respect to the optical axis for moving selectively one of the objective lens switching mechanism and the stage in linkage with the rough/fine motion focusing mechanism, in rough/fine motion and provided with a second rough motion handle for moving the one in rough motion relative to the rough/fine motion focusing mechanism and a second fine motion handle for moving in fine motion.

According to another aspect of the present invention, there is provided a microscope having an observation optical axis comprising: a frame main body having a base portion; an objective lens switching mechanism for switching two objective lenses by rotating back and forth relative to the observation optical axis; a stage for carrying a specimen; an ocular lens for observing a specimen image obtained with the objective lens; a rough/fine motion focusing mechanism disposed backward of the stage for moving the objective lens switching mechanism in the direction of the observation optical axis in rough motion or fine motion; a first rough motion handle and a first fine motion handle provided near the rough/fine motion focusing mechanism for operating the rough/fine motion focusing mechanism; a rough/fine motion focusing operation portion including a second rough motion handle and a second fine motion handle provided near a front end of the base portion for operating the rough/fine motion focusing mechanism; a linkage mechanism for linking the rough/fine motion focusing mechanism with the rough/fine motion focusing operation portion; and an operation lever for operating the objective lens switching mechanism, the rough/fine motion focusing operation portion and the operation lever being disposed on the side of the ocular lens relative to the observation optical axis.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiments given below, serve to explain the principles of the invention.

DETAILED DESCRIPTION OF THE INVENTION

Hereinafter, the embodiments of the microscope of the present invention will be described with reference to the accompanying drawings.

Figure 8:
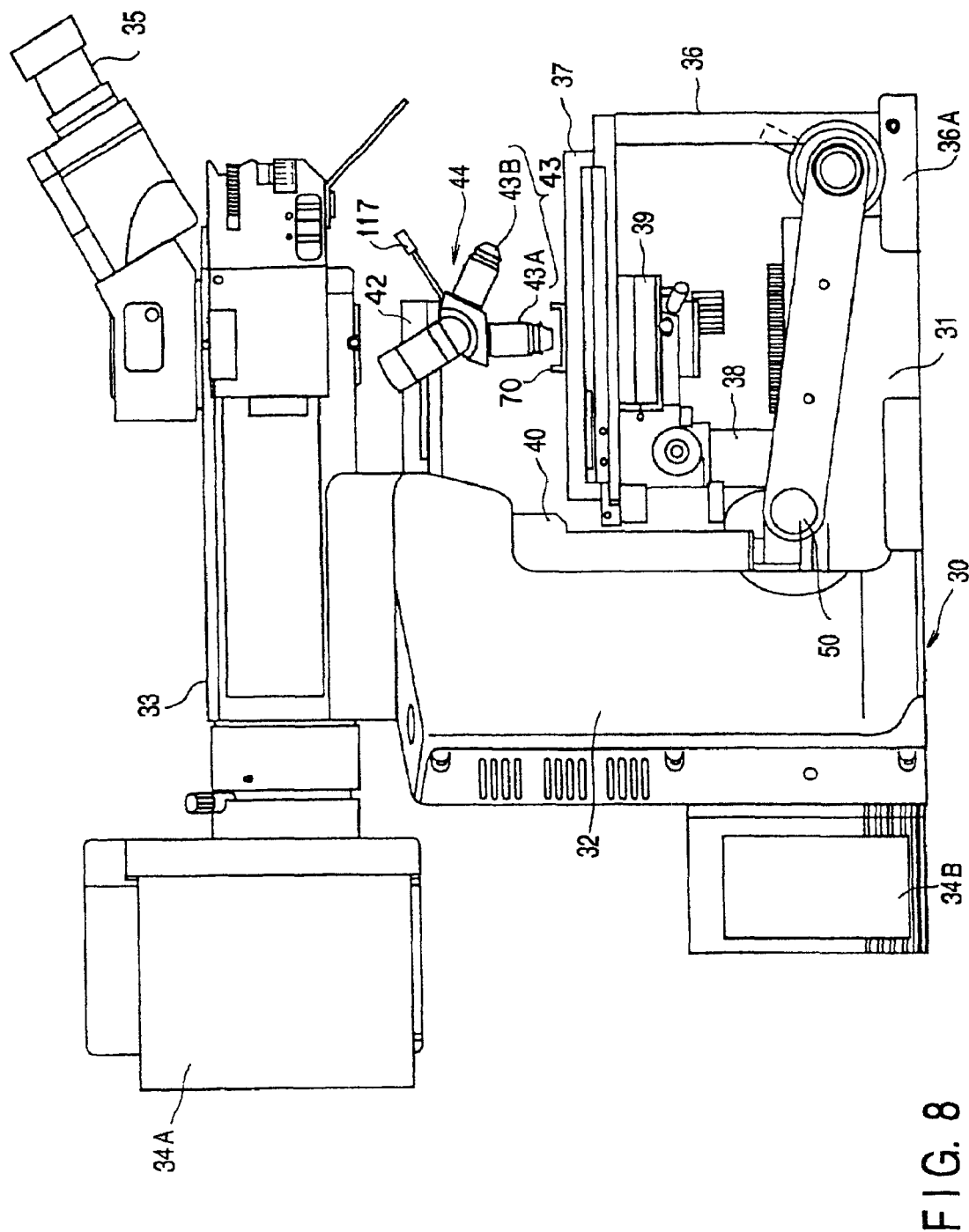
FIG. 8 is a side view showing schematically a microscope having the focusing apparatus and the objective lens switching apparatus according to the embodiment of the present invention.
Figure 9:
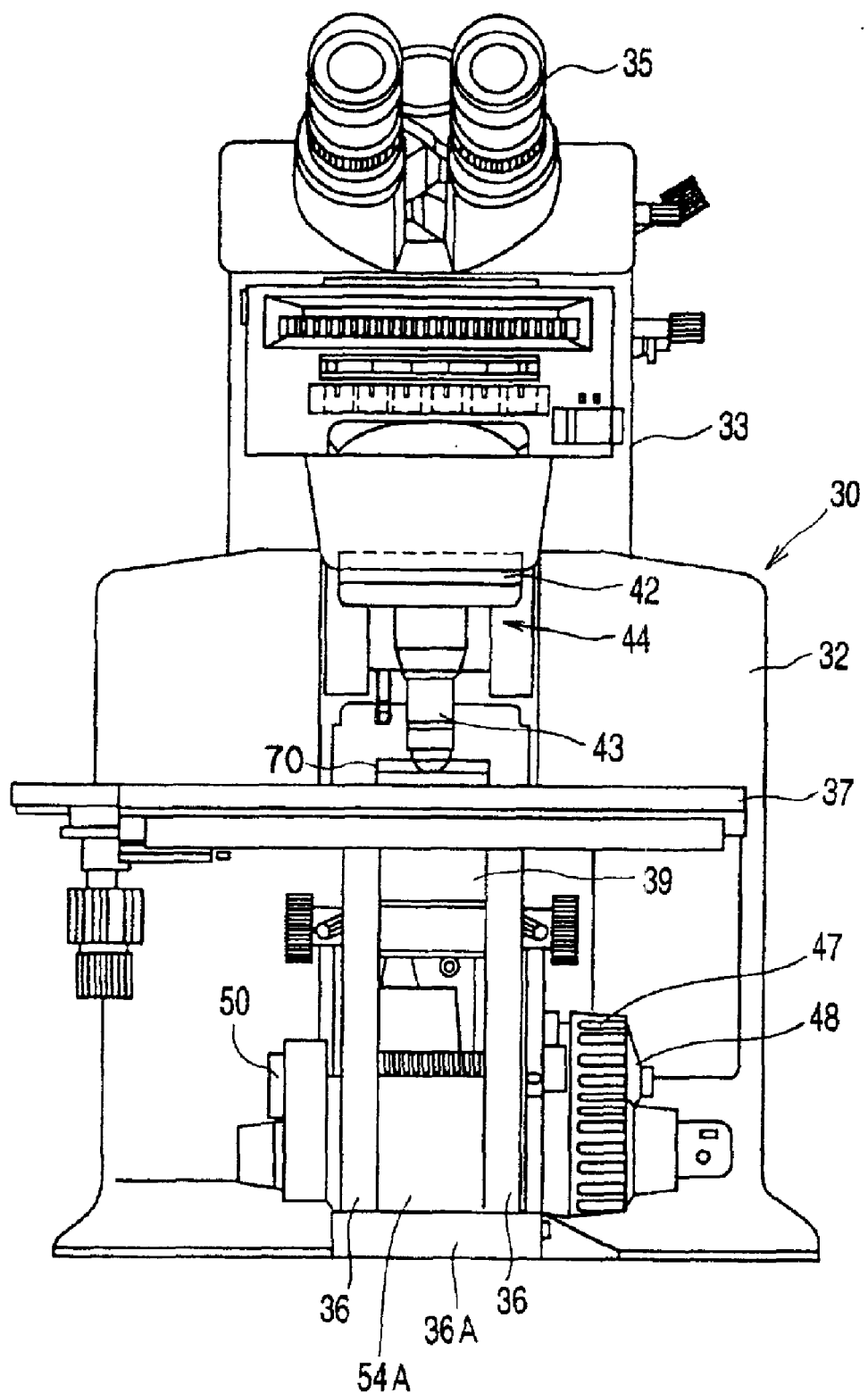
FIG. 9 is a front view showing schematically the microscope shown in FIG. 8.
Figure 10:
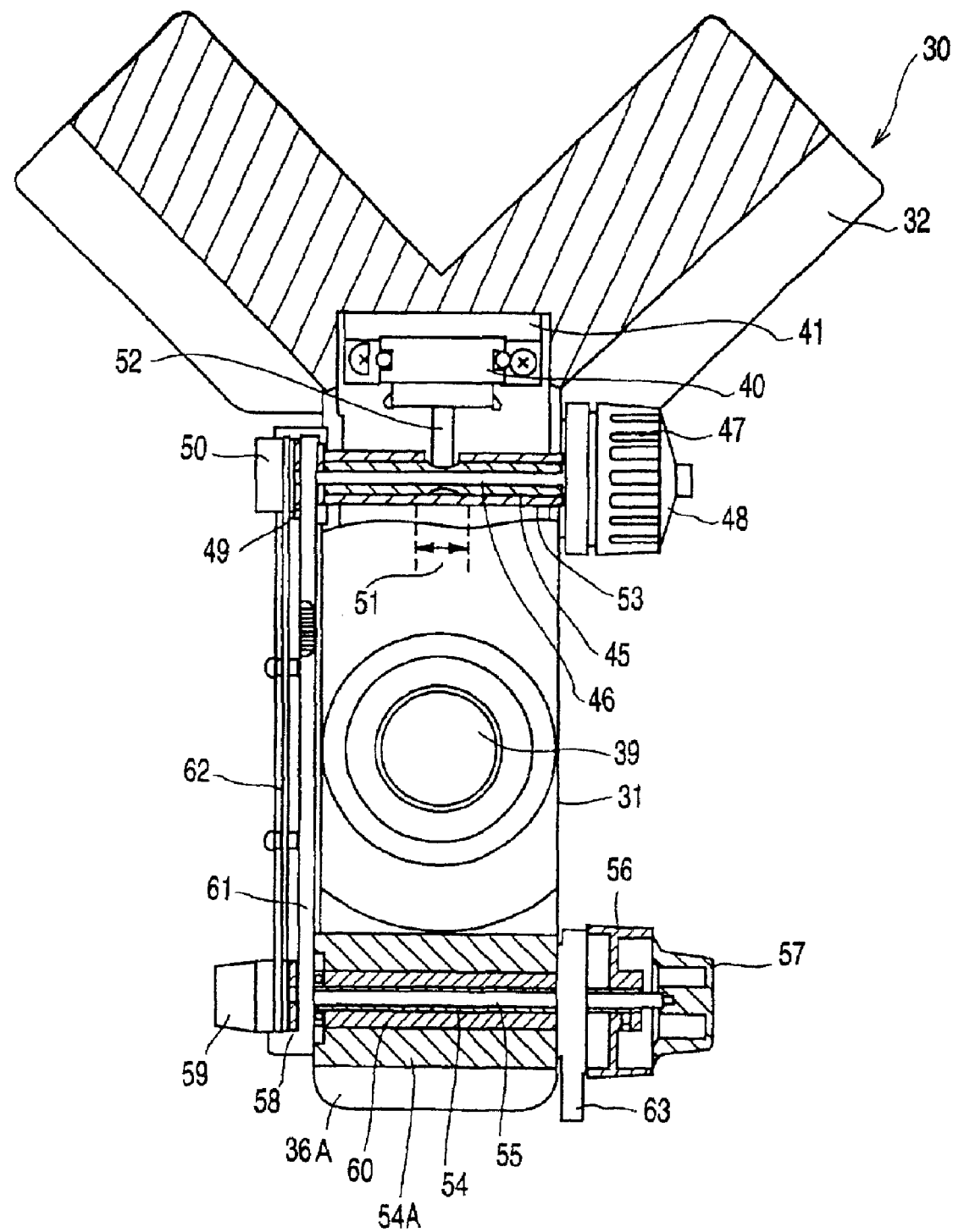
FIG. 10 is a partially broken plan view showing schematically the structure of the focusing apparatus of the microscope shown in FIG. 8.

FIGS. 8 and 9 are a side view and a front view showing schematically a microscope having the focusing apparatus according to an embodiment of the present invention. FIG. 10 is a sectional view showing schematically the structure of a base portion viewed from top of the microscope shown in FIGS. 8 and 9.

A microscope frame 30 is formed in the shape of a letter Y and comprised of a base portion 31 and a vertical portion 32. A horizontal arm portion 33 for observation by light projection is installed on this vertical portion 32. This horizontal arm portion 33 for observation by light projection contains a downward illuminating light source 34A, and optical devices such as an ocular lens 35, various kinds of filters and beam splitter. A transmission illumination light source 34B is provided on a back of the vertical portion 32.

As shown in FIG. 8, a fixing base 36A is screwed on a front side of the base portion 31 of the microscope frame 30. Two legs 36, 36 are erected from this fixing base 36A and a stage 37 is fixed with these legs 36, 36. The vertical portion 32 of the stage 37 is fixed to the base portion 31 through a supporting base 38. A condenser lens 39 is supported by the supporting base 38 below the stage 37. This stage 37 can include a dish containing cell and a manipulator (not shown) can be installed for handling the cell.

A movable base 40 is provided movably upward and downward on the vertical portion 32 of the microscope frame 30. As shown in FIG. 10, the movable base 40 is supported freely movably by a guide body 41. A movable arm 42 is supported in the cantilever form by the movable base 40. This movable arm 42 includes objective lens switching mechanism 44 having two objective lenses 43A, 43B, one of which having a desired magnification can be used, the objective lens switching mechanism being detachable.

A rough/fine motion focusing mechanism, which moves the movable base 40 in rough movement or in fine movement upward or downward, is provided backward of the base portion 31 of the microscope frame 30, that is, on a deeper side than the stage 37 as views from an observer. This rough/fine motion focusing mechanism is provided on an opposite side to the observer with respect to an optical axis of the observation optical system of the microscope, that is, on a rear side of the microscope. As shown in FIG. 10, this rough/fine motion focusing mechanism includes a rough movement shaft 45 and a fine movement shaft 46, provided coaxially. This rough movement shaft 45 is formed in a hollow structure and the fine movement shaft 46 is inserted into the hollow rough movement shaft 45. A rough movement handle 47 and a fine movement handle 48 are provided on an end portion on the right side in FIG. 10, of each of the rough movement shaft 45 and the fine movement shaft 46. The rough movement handle 47 is connected to the rough movement shaft 45 so that a rotation force of the rough movement handle 47 is transmitted to the rough movement shaft 45 so as to rotate the rough movement shaft 45. The fine movement handle 48 is connected to the fine movement shaft 46 and further connected to the rough movement shaft 45 through a reduction gear (not shown). A toothed pulley 49 is mounted on the other end of the rough movement shaft 45 and a fine movement pulley 50, in which a V-shaped groove is formed, is installed on the other end of the fine movement shaft 46.

Figure 11:
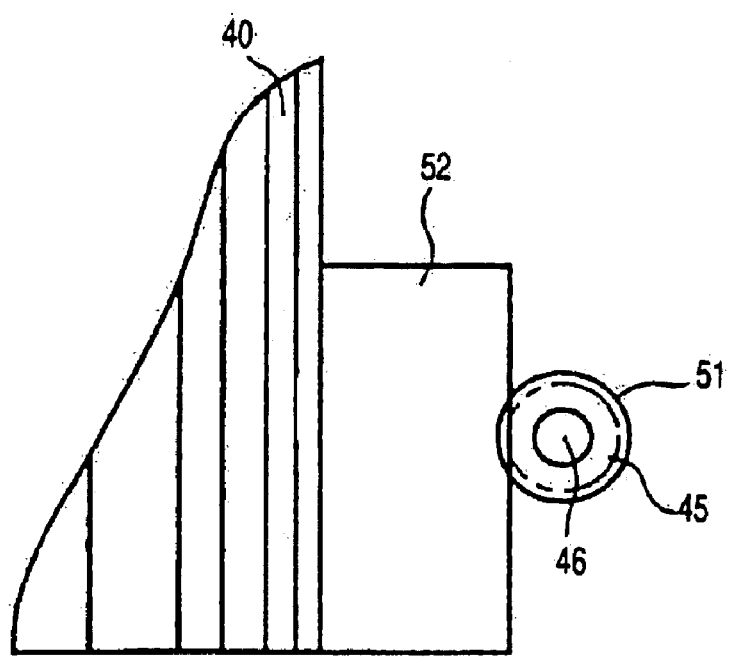
FIG. 11 is a partially broken sectional view showing schematically the structure of a rough movement shaft in the focusing apparatus of the microscope shown in FIGS. 8 to 10.

FIG. 11 shows a section of the central portion of the rough movement shaft 45. A pinion portion 51 is formed in the central portion of this rough movement shaft 45. This pinion portion 51 has a diameter larger than an outside diameter of the rough movement shaft 45 and has a tooth portion on its outer circumference. This pinion portion 51 meshes with a rack 52 fixed on the movable base 40. Meanwhile, the rough movement shaft 45 is supported by a bearing 53 fixed on the base portion 31.

Therefore, if the rough movement handle 47 is rotated, this rotation is transmitted to the rough movement shaft 45 so as to be transformed to a vertical motion through the pinion portion 51 and the rack 52. If this rack 52 is moved up or down, the movable arm 42, on which an objective lens 43 supported by the movable base 40 is mounted, is moved in rough movement vertically.

If the fine movement handle 48 is rotated, this rotation is transmitted to the rough movement shaft 45 through a reduction gear with reduction of the rotation speed and transformed to a vertical movement through the pinion portion 51 and the rack 52. When this rack 52 is moved up/down, the movable arm 42, on which the objective lens 43 supported by the movable base 40 is mounted, is moved in fine motion vertically.

On the other hand, the rough/fine motion focusing operation portion for moving the objective lens 43 in rough motion or fine motion is provided on a front portion including a front end of the stage 37. That is, this rough/fine motion focusing operation portion is provided on a front side which is the side of an observer with respect to the optical axis of the observation optical system of this microscope. In this rough/fine motion focusing operation portion, as shown in FIG. 9, a substantially cylindrical operation portion main body 54A is screwed to the fixing base 36A fixed at a front end of the base portion 31 of a microscope frame. This operation portion main body 54A is formed in a hollow structure as shown in FIG. 10 and a sleeve-like bearing 60, a hollow rough motion shaft 54 and a fine motion shaft 55 are inserted coaxially. A rough motion handle 56 and a fine motion handle 57 are mounted on an end of each of the rough motion shaft 54 and the fine motion shaft 55, for example, on an end on the right side in FIG. 10. Meanwhile, the rough motion handle 56 and the fine motion handle 57 are screwed to the rough motion shaft 54 and the fine motion shaft 55 respectively.

The rough motion handle 56 is connected to the rough motion shaft 54, so that a rotation force of the rough motion handle 56 is transmitted to the rough motion shaft 54 so as to rotate the rough motion shaft 54. The fine motion handle 57 is connected to the fine motion shaft 55, so that a rotation force of the fine motion handle 57 is transmitted to the fine motion shaft 55 so as to rotate the fine motion shaft 55.

A toothed pulley 58 is attached to the other end of the fine motion shaft 55 and a fine motion knob 59, in which a V-shaped groove on whose circumferential face a round belt 62 is to be applied is formed, acting as a pulley at the same time, is mounted on the other end of the fine motion shaft 55. Meanwhile, the rough motion shaft 54 is supported by the bearing 60.

Figure 12:
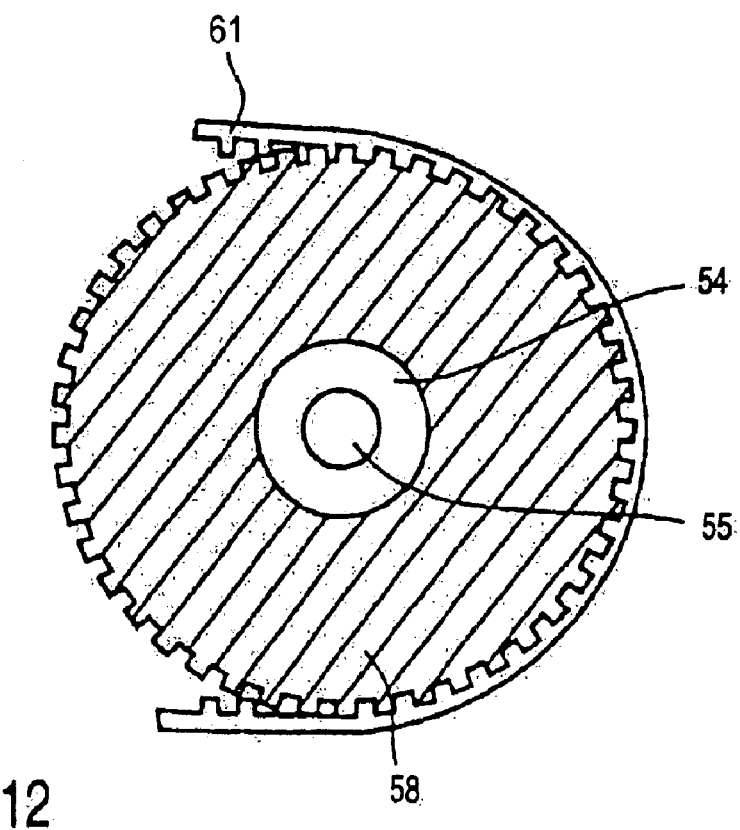
FIG. 12 is a sectional view showing schematically the structure of a toothed pulley and a timing belt in the focusing apparatus of the microscope shown in FIGS. 8 to 10.

A linkage mechanism is provided between this rough/fine motion focusing operation portion and the aforementioned rough/fine motion focusing mechanism. A toothed timing belt 61 as shown in FIG. 12 is applied between the toothed pulley 58 and the toothed pulley 49. The round belt 62 is applied between a pulley portion of the fine motion pulley 50, that is, the V-shaped groove and a pulley portion in the fine motion knob 59, that is, the V-shaped groove, so that the fine motion pulley 50 is connected to the fine motion knob 59. Therefore, the rough/fine motion focusing mechanism and the rough/fine motion focusing operation portion are linked with each other through the toothed timing belt 61, the round belt 62, the fine motion pulley 50, the fine motion knob 59 which serves as a pulley at the same time, and the toothed pulleys 49, 58.

A stopper handle 63 is provided on an inner side of the rough motion handle 56 such that it is freely rotatable. Rotating this stopper handle 63 in one direction prevents the objective lens 43 from moving downward so as to reduce a distance between the objective lens 43 and the stage 37 further and permits moving thereof upward. That is, when the objective lens 43 and the stage 37 reach a predetermined gap, the rotations of the rough motion handle 56 and the fine motion handle 57 which allow the objective lens 43 to be moved downward are locked.

Therefore, if the stopper handle 63 is rotated in one direction when the objective lens 43 is positioned at a desired position such as just focusing point by rotating the rough motion handle 56 and the fine motion handle 57, the downward motion of the objective lens 43 is locked at that position, so that the objective lens 43 is allowed to be moved only within a range upward from that position. Meanwhile, if the stopper handle 63 is rotated in the other direction, the downward motion of the objective lens 43 is unlocked.

In this way, the objective lens 43 is protected from falling down with respect to a locked position, for example, a focusing position. After the objective lens 43 is moved upward, the objective lens 43 is descended so as to attain refocusing so that the objective lens 43 is returned to the focusing position.

Next, the operation of the focusing apparatus having the structure shown in FIGS. 8 to 12 will be described.

When the observer places a specimen on the stage 37 and observes it, he rotates the rough motion handle 56 or the fine motion handle 57 provided on the front side of the microscope.

If the rough motion handle 56 on the front side is rotated, this rotation is transmitted to the timing belt 61 from the rough motion shaft 54 through the toothed pulley 58 and further transmitted from the toothed pulley 49 located deeper than the stage 37 to the rough motion shaft 54. Then, if this rough movement shaft 45 is rotated, this rotation is transformed to a vertical motion on the movable base 40 from the pinion portion 51 through the rack 52. If this rack 52 is moved up/down, the movable arm 42, on which the objective lens supported by the movable base 40 is mounted, is moved up/down in rough motion.

If the fine motion handle 57 on the front side is rotated, this rotation is transmitted from the fine motion shaft 55 to the round belt 62 through the fine motion knob 59 and further transmitted to the fine movement shaft 46 from the fine movement pulley 50 located deeper than the stage 37. Then, if this fine movement shaft 46 is rotated, this rotation is reduced in speed by a reduction gear and transmitted to the rough movement shaft 45, so that the rotation of this rough movement shaft 45 is transformed to a vertical motion from the pinion portion 51 through the rack 52. If this rack 52 is moved up/down, the movable arm 42, on which the objective lens 43 supported by the movable base 40 is mounted, is moved up/down in fine motion.

A case where the observer rotates the rough motion handle 56 or the fine motion handle 57 is, for example, a case where he sets up a manipulator and observes a specimen by handling this manipulator or a case where because the specimen is so large, a spacer is located between the vertical portion 32 and the horizontal arm portion 33 so as to raise an eye-point of the ocular lens 35. Because the rough motion handle 56 and the fine motion handle 57 on the front side are located at a place where the observer can reach easily with his hand, in this case, he can operate the rough motion handle 56 and the fine motion handle 57 while observing the specimen.

When the objective lens 43 is replaced during observation of the specimen or the specimen is replaced or some processing is carried out on the specimen, the stopper handle 63 on the front side is rotated in one direction, so that the rotation of this stop handle 63 in one direction locks a downward movement of the objective lens 43.

In replacement of the objective lens 43, replacement of the specimen or some processing on the specimen, usually, the rough motion handle 56 and the fine motion handle 57 are operated so as to move the objective lens 43 upward. If during such an operation, the objective lens is locked, even if the rough motion handle 56 and the fine motion handle 57 are operated erroneously, the objective lens 43 is not dropped from the locked position so that the safety of the specimen is secured.

In case of focusing again to the specimen after the replacement of the objective lens 43, the replacement of the specimen or some processing on the specimen, the objective lens 43 is descended to the locking position and the locking is released with the stopper handle 63, thereby facilitating refocusing.

The procedure for the observer to take for observing the specimen is as follows. Assume that as the objective lens 43, two objective lenses, namely, a low magnification (for example, 10-power) and a high magnification (for example, 40-power) are mounted on the objective lens switching apparatus 44.

(1) The observer releases the lock by operating the stopper handle 63 from the beginning.
(2) Next, the observer operates an operation handle 56, moving the objective lens 43 upward to secure a gap between the stage 37 and the objective lens 43.
(3) After that, a dish 70 containing a living specimen of an observation object is placed on the stage 37.
(4) An operation lever 117 for switching the objective lens is operated to switch from the high magnification lens to the low magnification lens.
(5) The rough motion handle 56 and the fine motion handle 57 (or the fine motion knob 59) is operated to make focusing on the specimen.
(6) A portion desired to be observed of the specimen is aligned with the center of field of view.
(7) The rough motion handle 56 is operated to move the objective lens 43 upward.
(8) The operation lever 117 for switching the objective lens 43 is operated to switch to the high magnification objective lens 43.
(9) The rough motion handle 56 and the fine motion handle 57 (or fine motion knob 59) are operated to make focusing on the specimen.
(10) The stopper handle 63 is operated to make locking.

Upon replacement of the specimen or objective lens 43 after such series operation, the objective lens 43 is retreated upward with the locking by the stopper handle 63. In this operation, for the microscope 43, the rough motion handle 56 for moving the objective lens 43 up/down, the fine motion handle 57, the stopper handle 63 and the operation lever 117 for switching the objective lens are operated. Because these components are disposed forward of the microscope 43 (forward of the observation optical axis), their operations are easy.

According to the above-described embodiment, the rough motion shaft 54 and the fine motion shaft 55 are provided coaxially on the front side including a front end portion of the stage 37 and the rough motion handle 56 and the fine motion handle 57 are attached to each end of the rough motion shaft 54 and the rough motion shaft 55. Further, these rough motion shaft 54 and fine motion shaft 55 are linked with the rough movement shaft 45 and the fine movement shaft 46 located deeper than the stage 37 through the timing belt 61 and the round belt 62 so as to move the objective lens 43 in rough motion or fine motion. Thus, in case where the manipulator is set up for the specimen and that specimen is observed or in case where because the specimen is so large, a spacer is imposed between the vertical portion 32 and the horizontal arm portion 33, so that the position (eye position) of the ocular lens 35 is raised, the rough motion handle 56 and the fine motion handle 57 on the front side can be operated easily, thereby improving the operability during observation of the specimen.

The structure of the rough/fine motion focusing operation portion comprised of the rough motion shaft 54 and the rough motion shaft 55 located on the front side, the rough motion handle 56 and the fine motion handle 57 is substantially the same as the structure of the rough/fine motion focusing mechanism comprised of the rough movement shaft 45 and the fine movement shaft 46 located deep on the stage 37, the rough movement handle 47 and the fine movement handle 48. Further because they are linked with each other through the timing belt 61 and the round belt 62, with such a simple structure, transmission accuracy can be improved with little looseness.

Therefore, the assembly of the rough/fine motion focusing operation portion, the rough/fine motion focusing mechanism and the linking mechanism is easy and the adjustment thereof is also easy. Additionally, these mechanisms can be added at a cheap cost.

Because the stopper handle 63 is provided on the front side, when refocusing is carried out with the downward motion of the objective lens 43 locked, for example, when a specimen is observed by handling the manipulator or the specimen is so large that the eye point is raised, the refocusing operation can be carried out easily.

The rough/fine motion operating mechanism of this embodiment can be attached to a microscope having a conventional focusing mechanism after. That is, the fixing base on which the operation portion main body is fixed is installed on a front end of the base portion of the microscope frame and then, the rough motion handle and the fine motion handle of the existing focusing mechanism are replaced with pulleys and these pulleys are connected to a rough motion pulley and a fine motion pulley of the operation portion main body amp with two belts. Consequently, the focusing operation portion can be situated forward of the observation optical axis without a large reconstruction by using the existing focusing mechanism disposed backward of the observation optical axis as it is.

According to this embodiment, the mounting base for use in fixing the operation portion main body on the base portion of the microscope frame is employed for fixing the legs supporting the stage at the same time. As a result, such a large stage can be held stably and because the rough/fine motion focusing operation portion is disposed forward, the operability of the focusing mechanism can be maintained excellent even if the stage is enlarged so that it is extended forward.

The focusing mechanism according to the above described embodiment may be modified as follows.

Figure 1:
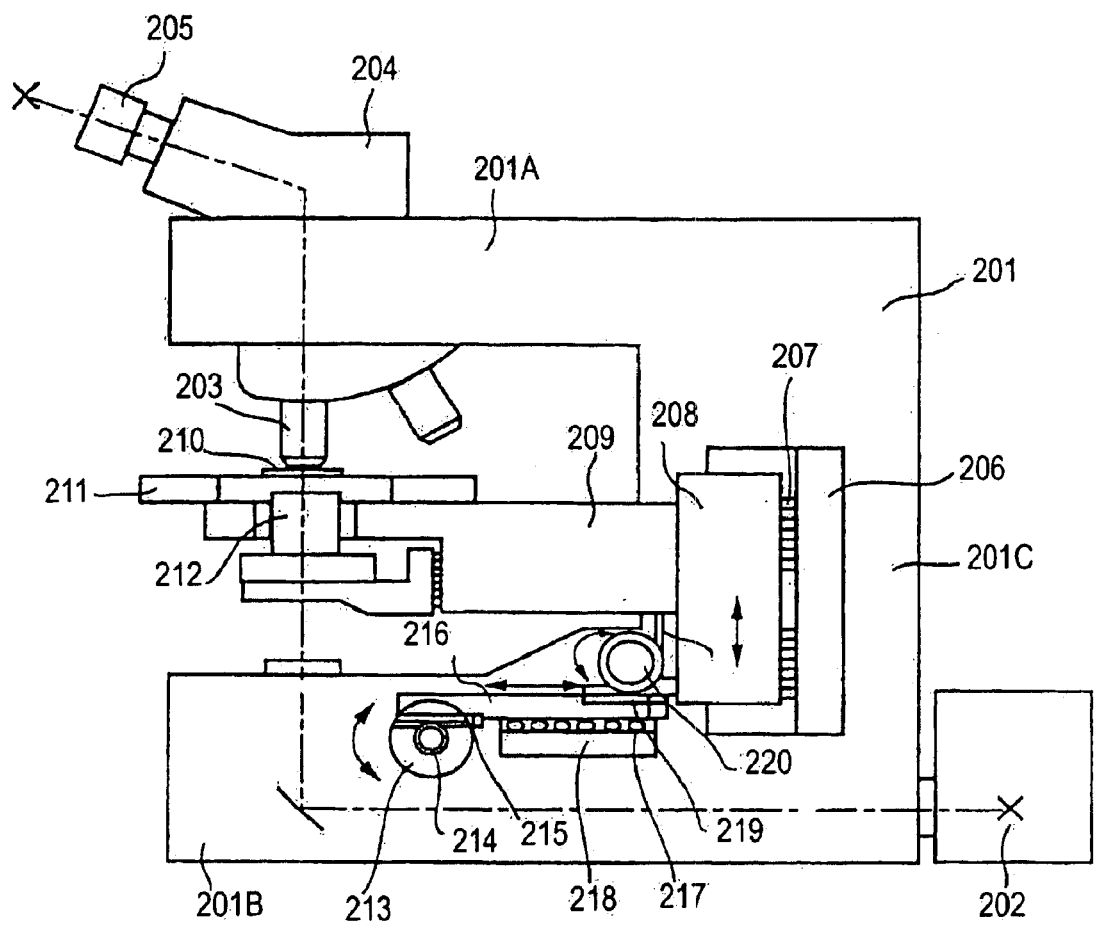
FIG. 1 is a partially broken side view showing schematically the structure of a microscope having a conventional focusing apparatus.
Figure 2:
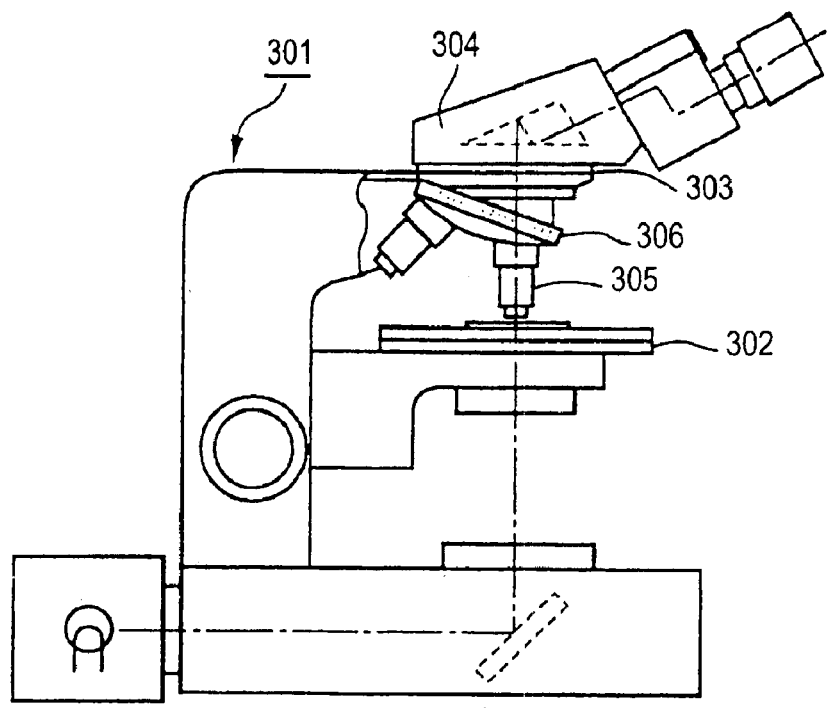
FIG. 2 is a side view showing schematically the structure of a microscope having a conventional objective lens switching apparatus.
Figure 3:
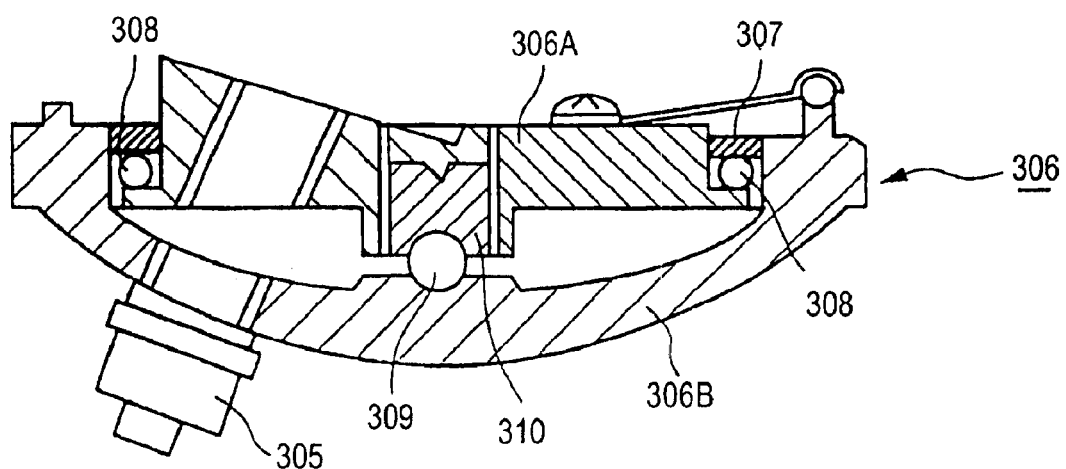
FIG. 3 is a side sectional view showing schematically a revolver mechanism applied to the objective lens switching apparatus shown in FIG. 2.
Figure 4:
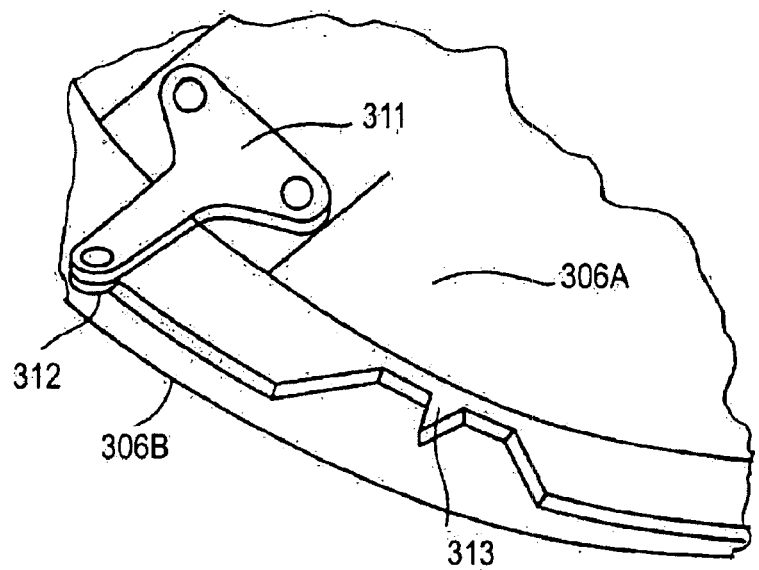
FIG. 4 is a partially broken perspective view showing schematically a positioning mechanism provided in the revolver mechanism shown in FIG. 3.
Figure 5:
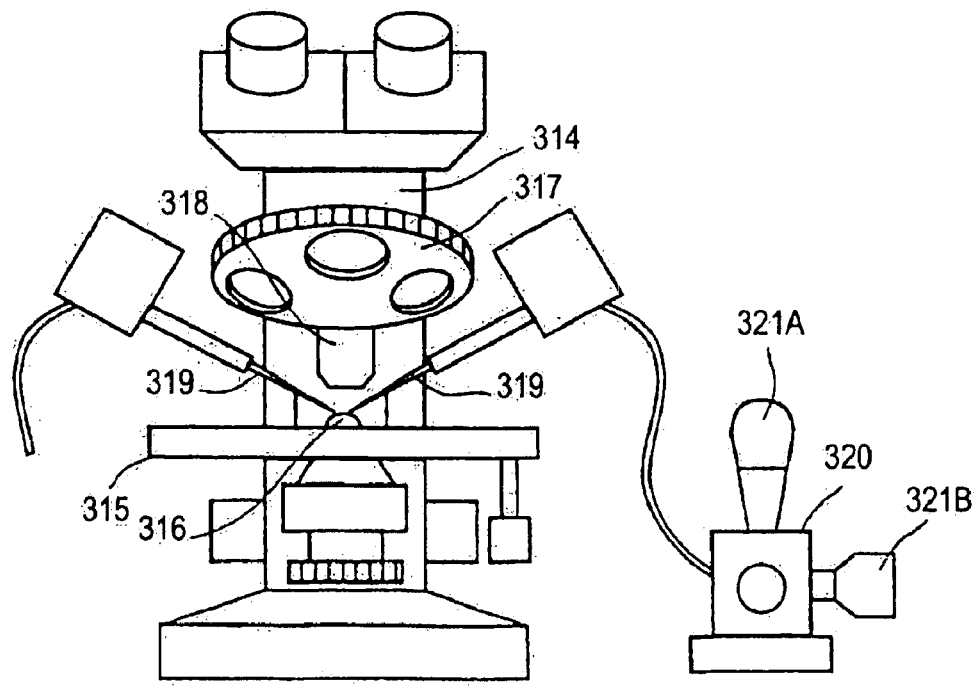
FIG. 5 is a front view showing schematically an optical microscope system in which a conventional manipulator is combined.
Figure 6:
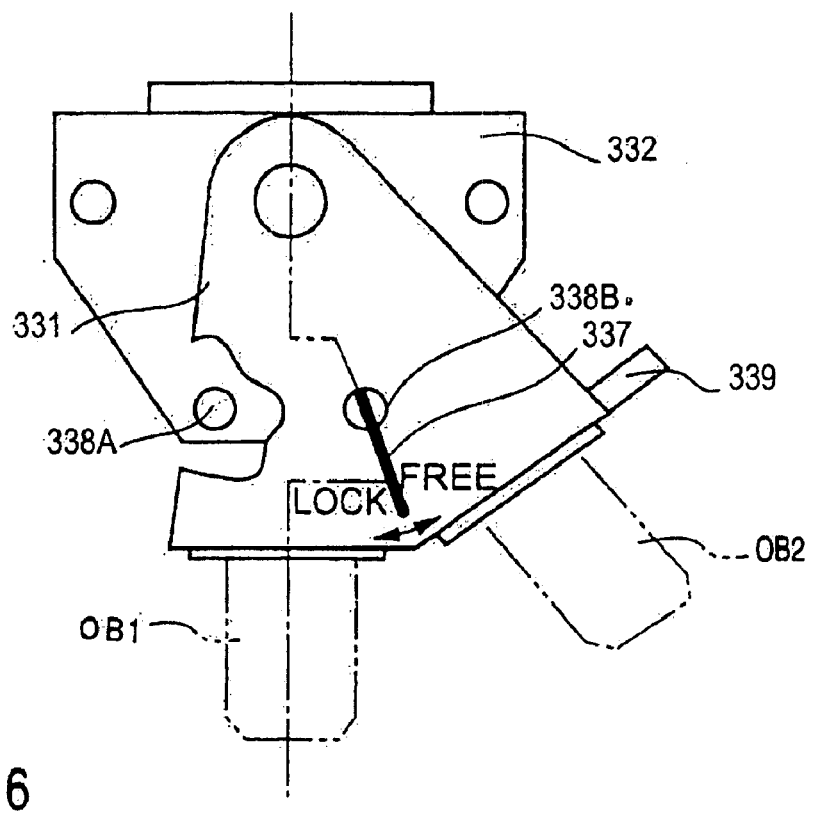
FIG. 6 is a side view showing schematically other structure of a conventional objective lens switching apparatus.
Figure 7:
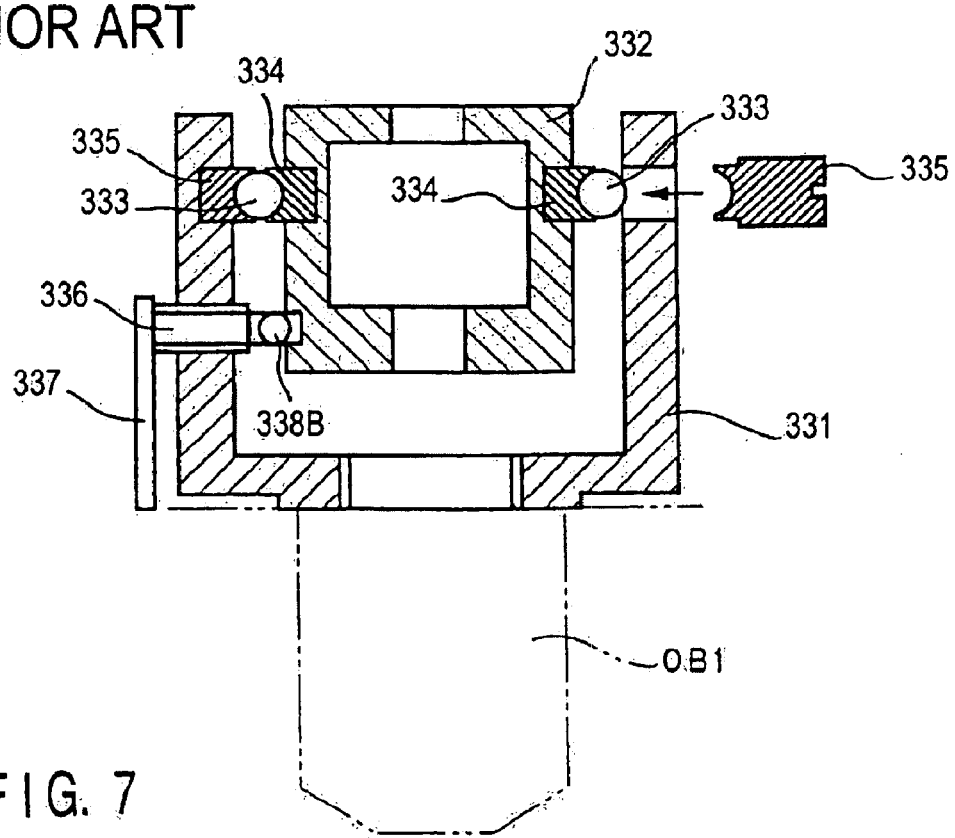
FIG. 7 is a sectional view schematically the structure of the objective lens switching mechanism for explaining the structure of the objective lens switching apparatus shown in FIG. 6.

Although according to the above-described embodiment, the movable arm 42 on which the objective lens 43 is to be mounted is moved vertically by the rough motion handle 56 and the fine motion handle 57 on the front side, it is permissible to apply such a structure that the stage 37 is moved vertically to the focusing mechanism. This structure that the stage is moved vertically has been disclosed in U.S. Ser. No. 09/729,592 "Drive Mechanism of Focusing Device" (invented by Souji Yamamoto) filed Dec. 4, 2000, now U.S. Pat. No. 6,512,632, which is assigned to the same assignee as this application and all the content of this prior application is incorporated in this specification. In this prior application, the rough/fine motion focusing mechanism is provided on an opposite side to the front side with respect to the optical axis of the microscope as described previously. Therefore, if the rough/fine motion focusing operation portion described with reference to FIGS. 8 to 12 is so constructed to drive the rough/fine motion focusing mechanism through the linking mechanism, such a structure that the stage is moved vertically is achieved. Additionally, a stopper mechanism for restricting the motion of the stage has been also disclosed in this prior application as shown in FIG. 6. This stopper mechanism is applicable to a mechanism including the stopper handle 63 shown in FIG. 10. A description of the rough/fine motion focusing mechanism for moving the stage vertically and the stopper mechanism is omitted by incorporating all the content of the aforementioned prior application to U.S. patent in this specification, for simplification of the description thereof.

Although the respective rough motion handles 47, 56 and the respective fine motion handles 48, 57 are installed on the right side of the microscope as shown in FIG. 10, they may be installed on the left side or both sides.

Next, the objective lens switching mechanism 44 of the microscope shown in FIG. 8 will be described.

Figure 13:
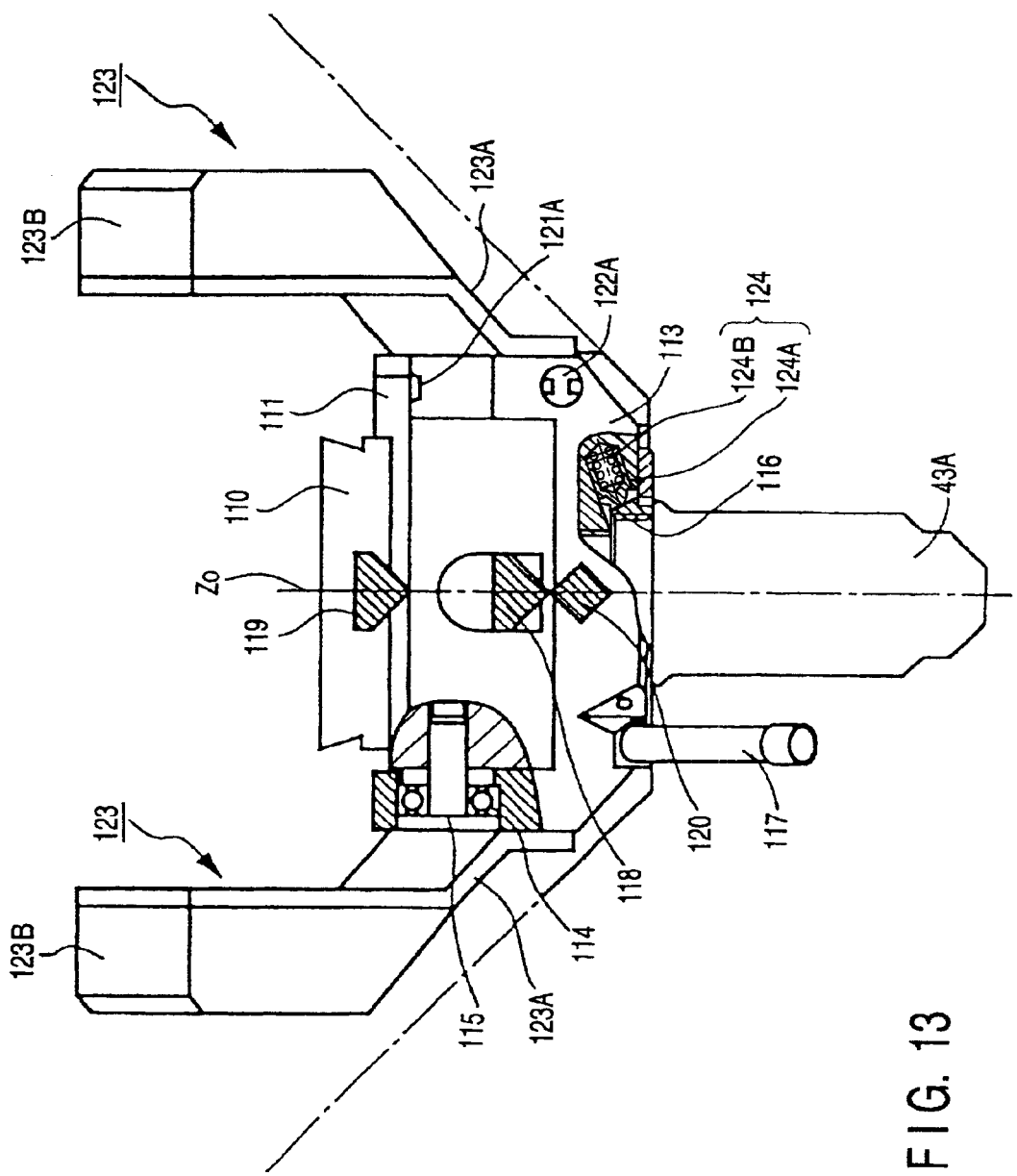
FIG. 13 is a partially broken front view showing the structure of an objective lens switching apparatus in the microscope shown in FIG. 8.
Figure 14:
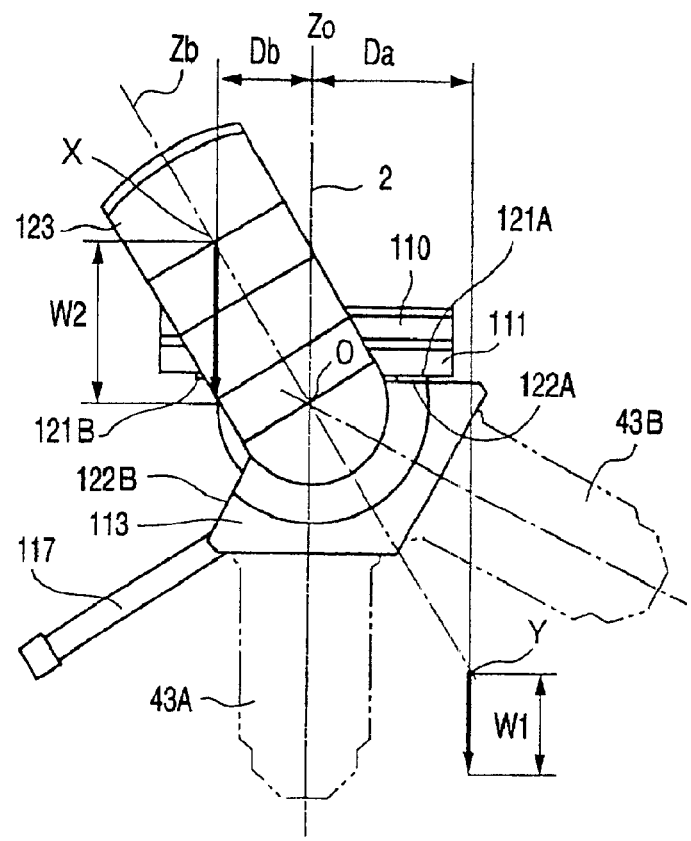
FIG. 14 is a side view showing schematically the structure of the objective lens switching apparatus in the microscope shown in FIG. 13.
Figure 15:
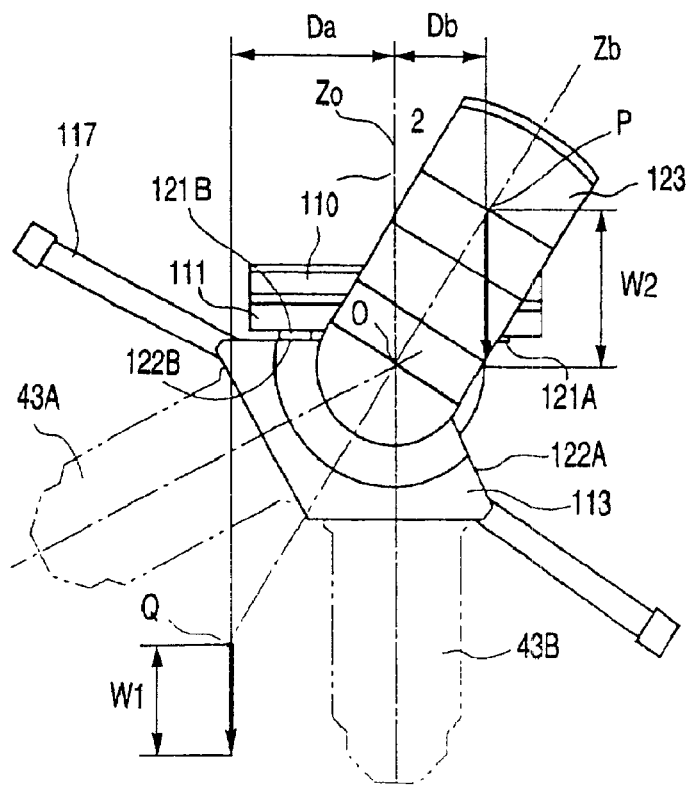
FIG. 15 is a side view showing schematically the structure of the objective lens switching apparatus in case where an objective lens in the objective lens switching apparatus shown in FIG. 13 is switched.

The objective lens switching mechanism 44 shown in FIGS. 13 to 16 is held by the movable arm 42. FIG. 13 is a partially broken front view showing schematically the structure of the objective lens switching mechanism 44 and part thereof indicates a sectional view around the rotation shaft. FIGS. 14 and 15 are side views of the objective lens switching mechanism 44 shown in FIG. 11 for explaining an operation of the objective lens switching mechanism 44.

As shown in FIGS. 8 and 9, the movable arm 42 is provided with a female dovetail (not shown) for fixing the objective lens switching mechanism 44. The objective lens switching mechanism 44 includes a fixing member 111 shown in FIG. 13 and this fixing member 111 has a male dovetail which is joined to the female dovetail on the side of the movable arm 42. Further, a rotating member 113 is supported rotatably through a rotation shaft 115 disposed in a direction perpendicular to the optical axis Z0 of the microscope. This rotating shaft 115 is provided on the fixing member 111 via a bearing 114, so that the rotating member 113 is held rotatably without any swing.

Figure 16:
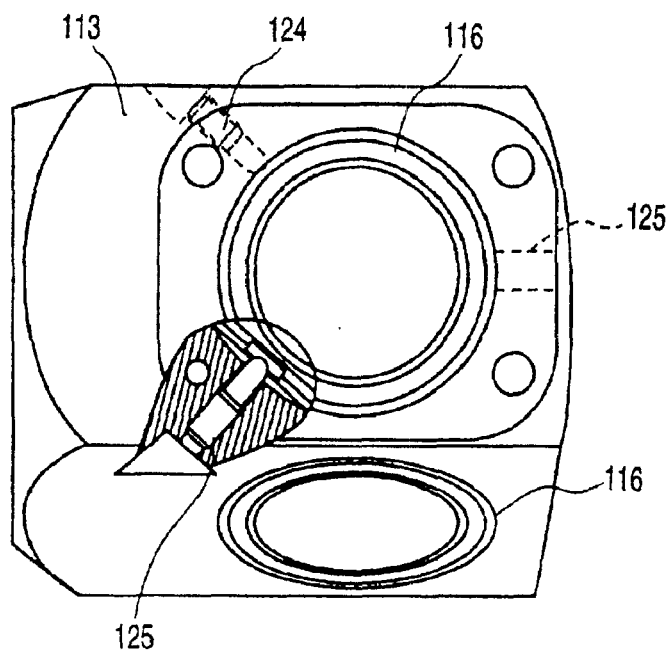
FIG. 16 is a partially broken plan view showing schematically the structure of the objective lens switching apparatus shown in FIG. 13.

The objective lens 43A, 43B are disposed circularly on the rotating member 113 and when this rotating member 113 is rotated, these objective lenses 43A, 43B are rotated along the direction of their disposal. This rotating member 113 includes a mounting portion 116 on which the objective lenses 43A, 43B are to be screwed, for example, screw hole. The mounting portion 116 is pressed by a pressing member 124 comprised of a cylindrical convex portion 124A and a coil spring 124B through a single point and by driving screw members 125 from two directions against this pressing point as shown in FIG. 16, the position of the objective lens can be adjusted. That is, by adjusting a driving amount of the screw member 125, axial deviation of the rotating member 113 including the axial deviation of the objective lenses 43A, 43B is adjusted so that a deflection of an observation position when the objective lenses 43A, 43B are switched is eliminated.

Restricting members 121A, 121B for restricting the rotation of the rotating member 113 are provided on an end portion in the back and forth direction of the fixing member 111. The rotating member 113 has contact portions 122A, 122B which contact the restricting members 121A, 121B due to the rotation thereof. In this case, a protrusion amount of each of the restricting members 121A, 121B is adjusted so that the objective lenses 43A, 43B and the optical axis Z0 are positioned accurately when the objective lenses 43A, 43B are switched, and with this condition, they are fixed with screws or adhesive agent.

The rotating member 113 is provided with two weights 123, 123 as an urging means. These weights 123, 123 are provided to hold the posture of the rotating member 113 when the contact portions 122A, 122B of the rotating member 113 make contact with the restricting members 121A, 121B in order to switch the objective lenses 43A, 43B. As shown in FIG. 14, the weight 123 is rotated around the same rotation center O as the rotating member 113 and disposed in an opposite direction to the objective lenses 43A, 43B along an axis Zb passing the intermediate of an angle in the rotation direction between the objective lenses 43A and 43B. The weight 123 has an axis Zb which is inclined at 45° with respect to the optical axis Z0 so that it does not obstruct an apparatus for cell operation such as the manipulator and does not interfere with the fixing member 111 when the rotating member 113 is rotated. That is, the weight 123 is constituted of a mounting portion 123A to the rotating member 113 and a weight main body 123B having the axis Zb, and has a gravity center at a position X on the axis Zb apart from the rotation center O of the rotating member 113.

As shown in FIG. 13, the fixing member 111 has fixing side indexes 118, 119 and the rotating member 113 has a diamond shaped rotating side index 120. The fixing side indexes 118, 119 and the rotating side index 120 are disposed along the rotation direction of the rotating member 113. At both ends of the rotation range of the rotating member 113, it is notified an operator that the rotating side index 120 approaches the fixing side index 118 or 119 along the rotation direction so that the rotating member 113 approaches the restricting members 121A, 121B.

When the objective lens 43A is switched onto the optical axis Z0 by rotating the rotating member 113 shown in FIG. 13 forward, it can be notified the operator that when the contact portion 122A of the rotating member 113 approaches the restricting member 121A, a front end portion of the rotating side index 120 approaches a vertex of the triangular fixing side index 118. Further, if the rotating member is rotated backward so as to switch the objective lens 43B onto the optical axis Z0, it can be notified the operator by a fact that the front end portion of the rotating side index approaches the vertex of the triangular fixing side index 119 when the contact portion 122B of the rotating member 113 approaches the restricting member 121B as shown in FIG. 15. If the rotating side index 120 and the fixing side indexes 118, 119 are positioned at the height of the eye line of the operator at the front face of the microscope main body, it is possible to make the operator recognize switching condition of the objective lenses 43A, 43B accurately.

The rotating member 113 is provided with the operation lever 117 for operating its rotation and the rotating member 113 is rotated by this operation lever 117 when switching the objective lenses 43A, 43B.

Next, an operation of the objective lens switching mechanism 44 having such a structure will be described.

Now, in a condition that as shown in FIG. 14, the objective lens 43A is switched onto the optical axis Z0, the objective lenses 43A, 43B and the rotating member 113 correspond to a rotary body. If the gravity center of this rotary body is assumed to be Y, rotary moment My is indicated by a product of mass W1 of the rotary body and a horizontal distance Da between the rotation center O of the rotating member 113 and Y, that is, My=W1·Da. On the contrary, if the gravity center of the weight 123 is assumed to be X (opposite side to the gravity center Y with respect to the rotation center O of the rotating member 113), the rotary moment Mx is indicated by a product of mass W2 of the weight 123 and a horizontal distance Db between the rotation center of the rotating member 113 and X, that is, Mx=W2·Db. If the rotary moments My, Mx are set up so that Mx>My by using the weight 123 having a sufficiently large mass W2, this is larger than the rotation force by the rotary body comprised of the rotating member 113 and the objective lenses 43A, 43B, so that if a rotation force in inverse direction is applied depending on the rotation angle of the rotating member 113, a force in a contact direction with the restricting member 121A acts on the rotating member 113 due to this rotary moment Mx thereby making it possible to hold the objective lens 43A on the optical axis Z0.

If from this condition, the rotating member 113 is rotated with the operation lever 117 as shown in FIG. 15 so as to switch the objective lens 43B onto the optical axis Z0, the gravity center of the rotary body at this time is moved to Q. Thus, a rotary moment Mq becomes Mq=W1·Da and the gravity center of the weight 123 is moved to P, so that the rotary moment Mp becomes Mp=W2B. In this case also, the relationship of Mp>M1 is generated and so a force in a contact direction with the restricting member 121B acts on the rotating member 113, thereby making it possible to hold the objective lens 43B on the optical axis Z0.

As for the objective lenses 43A, 43B to be installed onto the rotating member 113, sometimes, a low magnification one having a small mass and a high magnification one having a large mass are installed mixedly. Thus, the gravity center of the rotary body may be deflected to the side of the high magnification one having such a large mass. However, if even when an objective lens having a maximum weight is mounted as the weight 123, such a lens having a large mass W2 is prepared to be able to move the rotating member 113 to the side of the restricting members 121A, 121B, even if weight balance is destroyed on the side of the rotating member 113, a force capable of moving the rotating member 113 to the side of the restricting members 121A, 121B securely can be applied. Although an operation force intensity when switching the objective lens increases with SIN function, change of force is attained substantially proportionally because the rotary angle is substantially 30°.

Thus, the objective lenses 43A, 43B can be switched onto the optical axis Z0 by only operating the operation lever 117 according to the operation force intensity determined by a rotary moment of the weight 123. Further, the rotating member 113 is positioned by being made into contact with the restricting members 121A, 121B. Therefore, as compared to a conventional positioning mechanism employing a click mechanism, accompanied by a sudden change of force intensity for introducing the click, no sudden change of force is generated for positioning the objective lens, so that a smooth switching operation without any vibration, required in manipulator operation can be assured.

Further, such a switching operation condition can be notified to the operator by a motion of the rotating side index 120 relative to the fixing side indexes 118, 119. Thus, by carrying out a careful operation just before the rotating member 113 strikes the restricting members 121A, 121B, a further accurate vibration free condition can be realized.

Further, because the rotating member 113 is positioned by making it in contact with the restricting members 121A, 121B, position reproducibility of micron order can be achieved, which is demanded in objective lens switching operation.

Because the switching of the objective lenses 43A, 43B can be carried out by only operating the operation lever 117, the switching operation can be executed easily.

Figure 18:
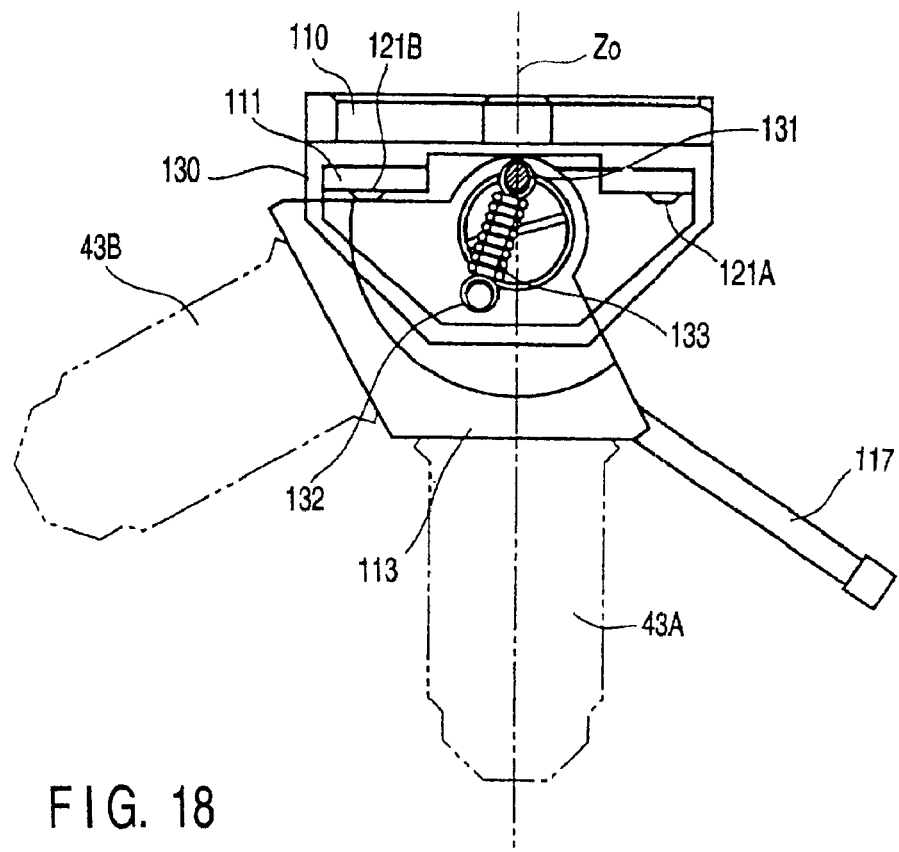
FIG. 18 is a partially broken sectional view showing schematically the structure of the objective lens switching apparatus shown in FIG. 17.
Figure 19:
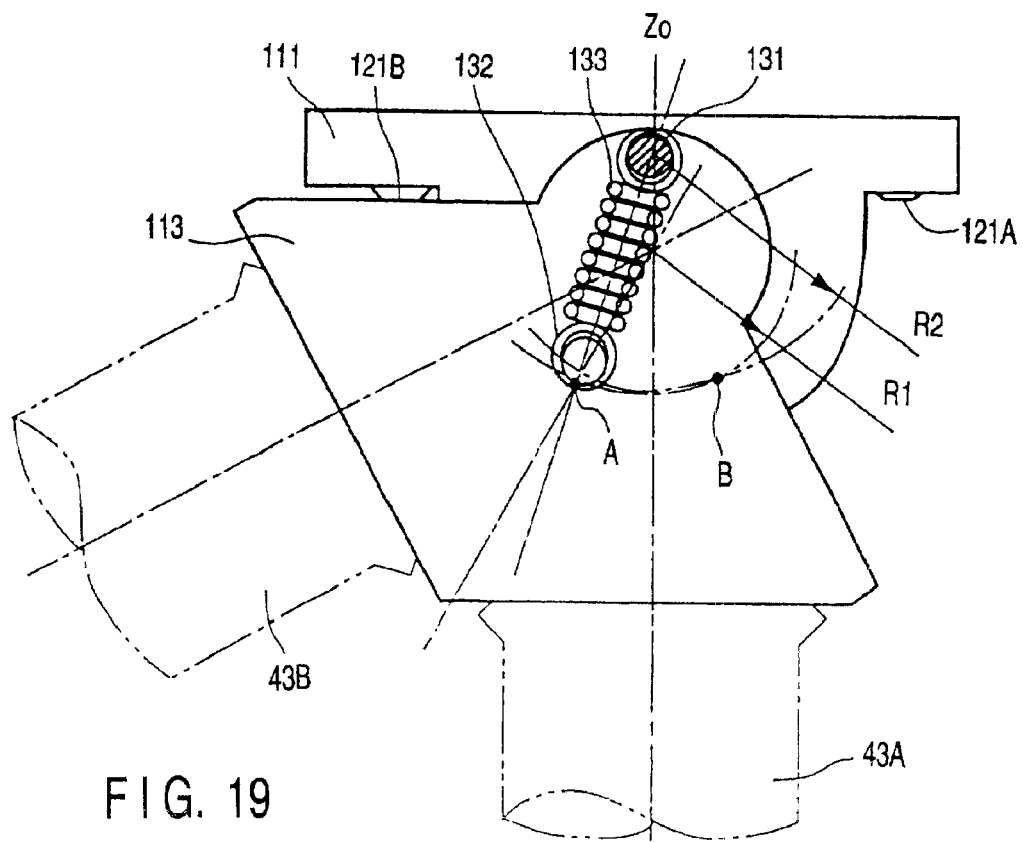
FIG. 19 is a schematic side view for explaining the structure of the objective lens switching apparatus shown in FIGS. 17 and 18.

A second embodiment of the lens switching mechanism 44 of the present invention will be described with reference to FIGS. 17 to 19.

Figure 17:
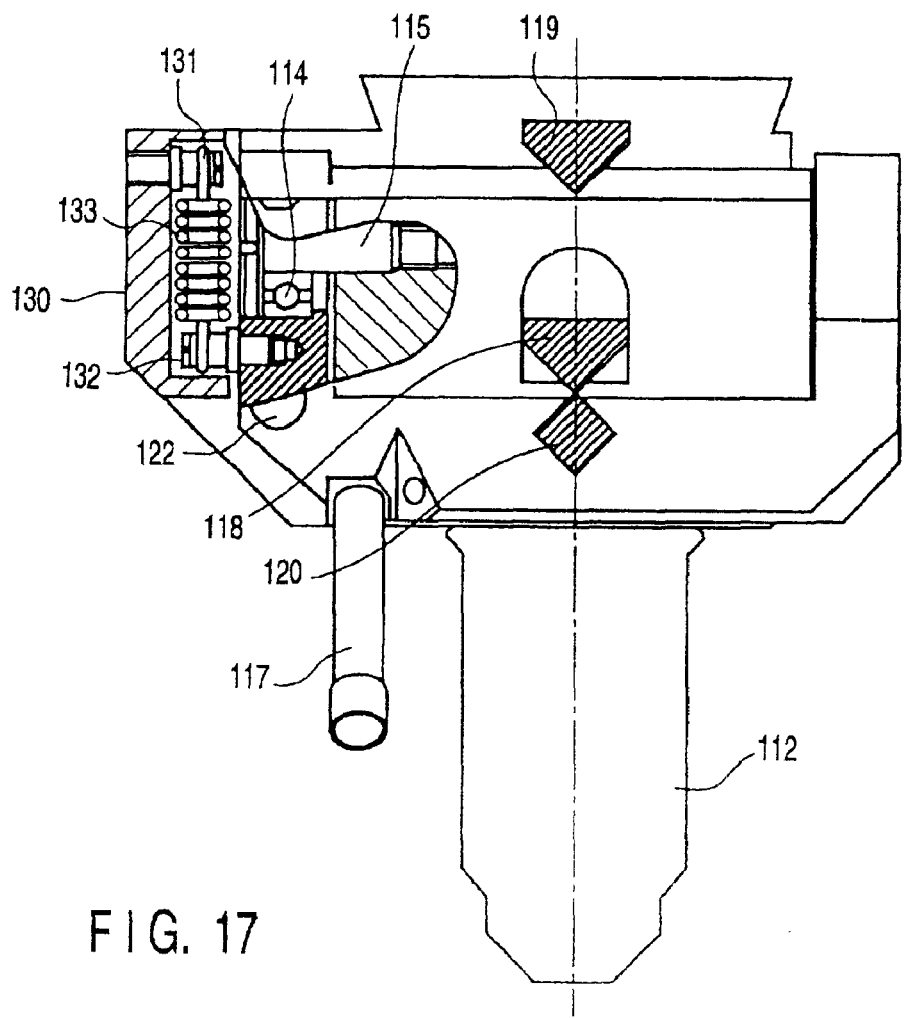
FIG. 17 is a partially broken side view showing schematically other structure of the objective lens switching apparatus shown in FIG. 13.

FIG. 17 is a front view of the objective lens switching mechanism 44 and part thereof indicates a sectional view around the rotation shaft. FIG. 18 is a side view of the same objective lens switching mechanism. In FIGS. 17 to 18, like reference numerals are attached to the same components as FIGS. 13 to 15 and a description thereof is omitted.

A cover 130 is attached to the side face of the fixing member 111 and a fixing portion supporting column 131 is provided as a spring fulcrum on an inner face of this cover 130. Further, a rotation side supporting column 132 is provided as a spring fulcrum on the side face of the rotating member 113 inside the cover 130. A tension spring 133 is provided between the fixing portion supporting column 131 and the rotation side supporting fulcrum 132.

These fixing portion supporting column 131 and rotation side supporting column 132 are disposed such that with the rotating member 113 located in the center of a rotation range, they sandwich the rotation shaft 115 supporting the rotating member 113 rotatably, in other words, they sandwich a rotation center O of the rotating member 113. Assuming that, as shown in FIG. 19, the radius of a trace drawn by the rotation side supporting column 132 when the rotating member 113 is rotated with respect to the rotation center O of the rotating member 113, is R1 and the radius of a trace drawn by the rotation side supporting column 132 relative to the fixing portion supporting column 131 when the objective lens 43A (43B) is positioned to the optical axis Z0, is R2 while the relation of R2>R1 is maintained, these R1, R2 are determined to intersect each other at positions where the objective lenses 43A, 43B are positioned on the optical axis Z0, that is, on both end positions A, B in the rotation range of the rotating member 113.

Under such a condition, a rotary moment of the tension spring 133 is given as a product of component of force in the rotation direction of the rotating member 113 and the radius R1 and this rotary moment is inverted in its application direction across the center portion of the rotation range of the rotating member 113. If the rotary moment at this time is set up to be sufficiently larger than the rotary moment by the rotating member 113, that is, in this case also, a rotation force larger than that caused by the rotating body comprised of the rotating member 113 and the objective lenses 43A, 43B in an opposite direction is allowed to act depending on the rotation angle of the rotating member 113, a force for bringing rotating member 113 into contact with the restricting members 121A, 121B is applied by the rotary moment of the tension spring 133, so as to hold the objective lenses 43A, 43B on the optical axis Z0.

Thus, if the operation lever 117 is operated with an operation force intensity determined by the rotary moment by the tension spring 133, the switching and positioning of the objective lens are enabled as described above. Therefore, the switching operation without any vibration demanded in manipulator operation can be obtained easily.

Further, because as for the operation force at this time, as it goes to both ends of the operation range, change of the force relative to the rotation angle decreases, the operation can recognize a substantial operation position and therefore, by carrying out careful operation depending on an operation position, a further higher precision vibration free state can be realized.

Further, because the tension spring 133 is incorporated inside the cover 130, so that a protrusion of the apparatus to the surrounding thereof can be reduced, a large manipulator installation space can be assured thereby making it possible to smooth the operation of the manipulator.

Further, because reduction in size and weight of the apparatus can be achieved, the apparatus can be handled easily when replacing the objective lens. Because the rotation force is obtained from the tension spring 133, such a restriction in the mounting direction to the microscope main body is eliminated unlike a case where the aforementioned weight is employed, and consequently, this apparatus can be applied to, for example, an inverted type microscope.

Next, a third embodiment of the lens switching mechanism 44 of the present invention will be described with reference to FIGS. 20 and 21.

Figures 20, 21:
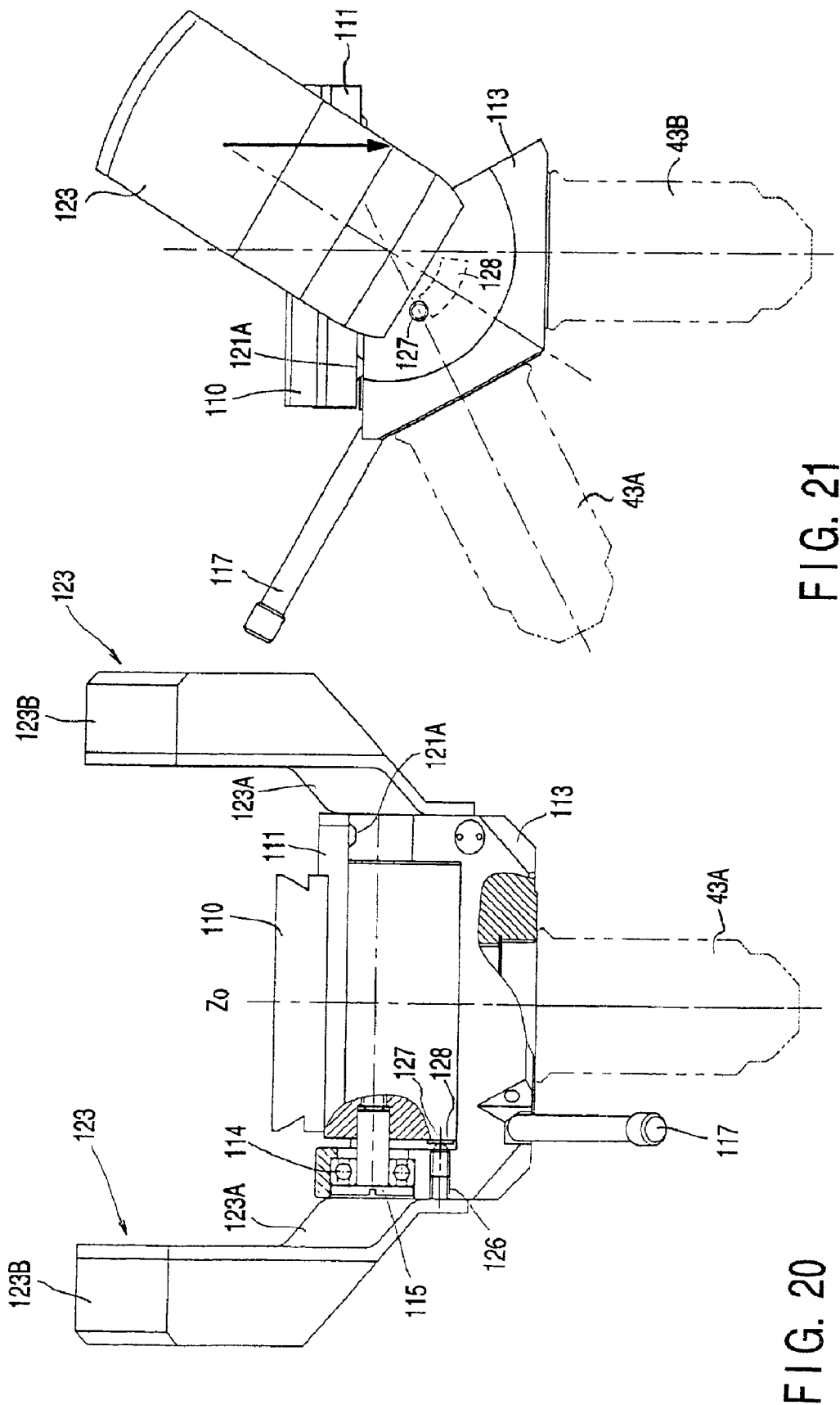
FIG. 20 is a front view showing schematically still other structure of the objective lens switching apparatus in a partially broken state in the microscope shown in FIG. 8.
FIG. 21 is a side view showing schematically the structure of the objective lens switching apparatus in the microscope shown in FIG. 20.

FIG. 20 is a front view of the objective lens switching mechanism 44 and part thereof indicates a sectional view around the rotation shaft. FIG. 21 is a side view of the objective lens switching mechanism 44. In FIGS. 19 and 20, like reference numerals are attached to the same components as FIGS. 13 to 15 and a description thereof is omitted.

The rotating member 113 contains a female screw 126 directed to the side face of the fixing member 111 and a rounded corner screw 127, which has a semispherical head, is driven into an end of this female screw 126. A friction member 128 of fan shaped resin is bonded to the side face of the fixing member 111. This friction member 128 is extended on the side face of the fixing member 111 so that with a rotation of the rotating member 113, the semispherical rounded corner screw 127 moves on the friction member 128 while keeping in contact therewith. On both end positions of the extension of this friction member 128, the rounded corner screw 127 leaves the friction member 128 and comes into a direct contact with the side face of the fixing member 111. That is, on both end positions of the rotation range of the rotating member 113, namely just before the contact portions 122A, 122B come into contact with the restricting members 121A, 121B, the rounded corner screw 127 leaves the friction member 128 and comes into direct contact with the side face of the fixing member 111. In an intermediate range before the contact portions 122A, 122B come into contact with the restricting members 121A, 121B, the rounded corner screw 127 stays on the friction member 128, so that a holding force is secured between the both.

In the lens switching mechanism 44 shown in FIGS. 20 and 21, when the objective lens 43A is positioned to the optical axis Z0 as shown in FIG. 20, a rotary moment in the direction trying to bring the restricting member 121A into a firm contact with the contact portion 112A, generated by the weight 123 is larger than a rotary moment generated by weights of the objective lens 43B and the rotating member 113 on a front portion having this optical axis Zb. Therefore, the restricting member 121A and the contact portion 112A are kept in a firm contact with each other and the objective lens 43A on a rear side is positioned such that the optical axis of the objective lens 43A coincides with the optical axis Z0.

When an observer or an operator switches the objective lens 43A to other objective lens 43B, the operation lever 117 is operated so as to rotate the rotating member 113. After the rotation starts, the restricting member 121A leaves the contact portion 112A and then a front end of the rounded corner screw 127 touches the friction member 128. If the rotating member 113 is rotated further, the front end of the rounded corner screw 127 rides on the friction member 128 and slides over the friction member 128 with a large friction. This friction force acts to prevent a rotation of the rotating member 113 and cancels a rotary moment generated by the weights of the objective lens 43B and the rotating member 113 or weight of the weight 123, so that this friction force acts to hold the rotating member 113 on the fixing member 111 with a larger force than this rotary moment. Therefore, even if the operator releases his hand from the operation lever 117, the rotating member 113 and the objective lens 43A are not rotated, but kept at that position. If the operator gives a larger force than a holding force generated by friction to the operation lever 117, the rotating member 113 is further rotated. Because the holding force generated by friction is approximate to a force which the operator can give to the operation lever 117 and there is an appropriate balance between the both forces, the operator does not feel a large burden when operating the lever. Because the rounded corner screw 127 is advanced or retreated so as to adjust the pressing force of the front end of the rounded corner screw to the friction member 128, the holding force generated by that friction force can be adjusted.

When the rotating member 113 is rotated by the operator's operating the operation lever 117 and the objective lens 43B on the front side approaches the optical axis Z, the restricting member 123B approaches the contact portion 122B, so that just before the restricting member 123B comes into a contact with the contact portion 122B, the front end of the rounded corner screw 127 leaves the friction member 128, thereby eliminating the friction force between the both. In this condition, the rotary moment of the objective lens 43A and the rotary member 113 is larger than the rotary moment by the weight of the weight 123, so that an action force for bringing the restricting member 123B into a firm contact with the contact member 122B is generated and then, the restricting member 123B comes into a firm contact with the contact member 122B. Thus, the objective lens 43B on the front side is positioned on the optical axis Z0 at a high precision and kept as it is.

Even if the observer releases the operation lever 117 by mistake during the operation, because the objective lens 43A and the rotating member 113 are kept to the fixing member 111 by the friction force as described above, there is no fear that the objective lens 43A and the rotating member 113 may accelerate toward one of combinations of the restricting members 121A, 121B and the contact members 122A, 122B and strike each other. Further, because the objective lens 43A and the rotating member 113 are kept until just before the restricting member 121 and the contact member 122 strike each other, the operator does not have to take care of the operation. Thus, any index for notifying that the restricting member 121 and the contact member 122 approach each other is not necessary. The change in force upon operation is small because the friction member 128 is made of thin sheetlike resin and further, the friction force can be adjusted to be slightly larger than the rotary moment by the weight 123, so that no large impact is generated unlike a conventional click mechanism, thereby preventing generation of vibration which affects inspection by observation and manipulation.

Because the lens switching mechanism has the above described structure, there is no sudden change in force for calling, which is generated by the click used as a positioning mechanism in the conventional example, thereby eliminating the necessity of taking care of an accurate distribution of applied force while seeing the index upon the operation and facilitating the switching operation without any vibration demanded in manipulation operation. Further, because the positioning is carried out with the rotating member in contact with the restricting member, position reproducibility in micron order demanded in the objective lens switching apparatus can be achieved.

A fourth embodiment of the lens switching mechanism of the present invention will be described with reference to FIG. 22.

Figure 22:
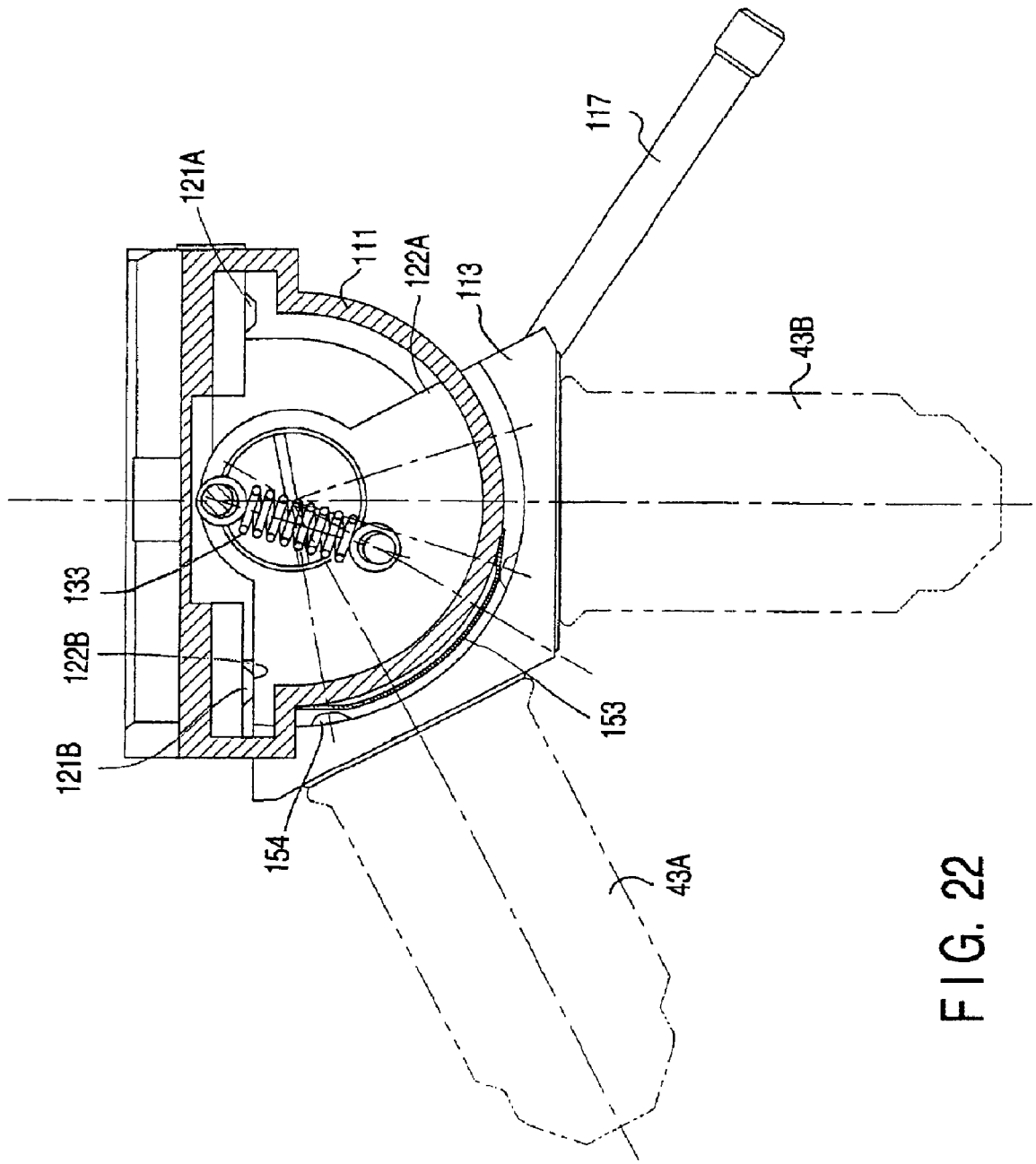
FIG. 22 is a side view showing schematically still other structure of the objective lens switching apparatus in a partially broken state in the microscope shown in FIG. 8.

FIG. 22 is a side sectional view showing schematically the structure of the fourth embodiment of the lens switching mechanism 44 of the present invention, indicating surrounding around the rotation shaft 115 with a partially broken view. FIG. 22 indicates a state when the objective lens 43A on the rear side is positioned on the optical axis Z0 of the microscope. In FIG. 22, like reference numerals are attached to the same component as FIGS. 13 to 20 and a description thereof is omitted.

The description of the lens switching mechanism of the fourth embodiment is omitted because the structure is substantially the same as described above.

In the mechanism shown in FIG. 22, the tension spring 133 described in the second embodiment is replaced with a weight as an example in which the same effect as the weight 123 described in the third embodiment is obtained. Because the effect of the tension spring 133 is the same as the second embodiment, see the description made with reference to FIG. 19.

As described above, the rotary moment by the tension spring 113 is inverted in the application direction across the center of the rotation range. The rotary moment by the tension spring 113 is a product of component of force in the rotation direction of the rotating member 113 and the radius R1 and the rotary moment by the tension spring 113 is determined to be larger than the rotary moment generated by the rotating body. That is, such a state that with the rotating member 113 in contact with the restricting member 121B, the objective lens 43A is positioned on the optical axis Z0 of the microscope is maintained.

In such a mechanism, a pressing member 154 so shaped as if a top face of a cone is flattened is provided on the inner face of the rotating member 113. An inner face of this rotating member 113 is formed on the same trace face as a circular face on a concentric circle on which the rotating member 113 rotates and a fixing member 111 having an outer face of a circular face on a concentric circle with a slight gap relative to this face is provided. A belt-like leaf spring 153 is provided on a trace formed by the pressing member 154 when it moves along that outer face. The leaf spring 153 has an arc slightly floating over the outer circular face of the fixing member 111 as shown in FIG. 22 while both the ends are fixed to the fixing member 111 such that they contact it firmly. In a state shown in FIG. 22, the pressing member 154 is situated at a position where the leaf spring 153 is in a firm contact with the outer face of the fixing member 111 in a mild form, while it is not yet in contact with the pressing member 154. With this state, because the force by the tension spring 133 exceeds the rotary moment by the weights of the objective lens 43A and the rotating member 113, the restricting member 121 is kept in a firm contact with the contact member 122. If the observer operates the operation lever 117 from this state and the rotating member is rotated so as to switch the objective lens 43A to the front side, the restricting member 121 is separated from the contact member 122, so that the pressing member 154 comes into a contact with the leaf spring 153 gradually. Because a friction force is generated by a force of the pressing member 154 for pressing the leaf spring 153 and a repulsive force of the leaf spring 153 which repels that force and that friction force exceeds a force of the tension spring 133, the rotation of the objective lens 43A and the rotating member 113 by the tension spring 133 is extinguished. Therefore, even if the observer releases his hand from the operation lever 117, the objective lens 43A and the rotating member 113 are kept at their positions so that they are not rotated in any direction.

If the observer rotates the objective lens 43A and the rotating member 113 further resisting this friction force (a force holding the objective lens 43A and the rotating member 113), when the objective lens 43A on the front side approaches a state just before it is positioned on the optical axis, a force which presses the pressing member 154 against the leaf spring 153 decreases gradually. As a result, when the restricting member 121A on an opposite side comes into a contact with the contact member 122A, the pressing member 154 is completely separated from the leaf spring 153. As for a force on the lever 117, heaviness by the friction force decreases gradually from such a level that some extent of heaviness exists due to holding with the friction force and correspondingly, a force acting in a direction for bringing the restricting member 121A into a contact with the contact member 122A is generated by the tension spring 133. Because this force increases gradually since just before such a contact, even if the lever 117 is not operated carefully, there is no fear that vibration or a collision of the contact member 122A occurs. During a rotation stroke of the rotating member 113, it is permitted to release his hand, so that a special care does not have to be taken to the operation.

With the above described structure, as compared to the third embodiment, the size of the apparatus can be reduced and when reducing the friction force from just before the contact member 122A during the rotation stroke, the force intensity can be changed further smoothly due to the shape of the leaf spring 153. Further, the friction mechanism can be formed inside, thereby eliminating an influence of dust and dirt from outside.

Further, a fifth embodiment of the lens switching mechanism 44 of the present invention will be described with reference to FIG. 23.

Figure 23:
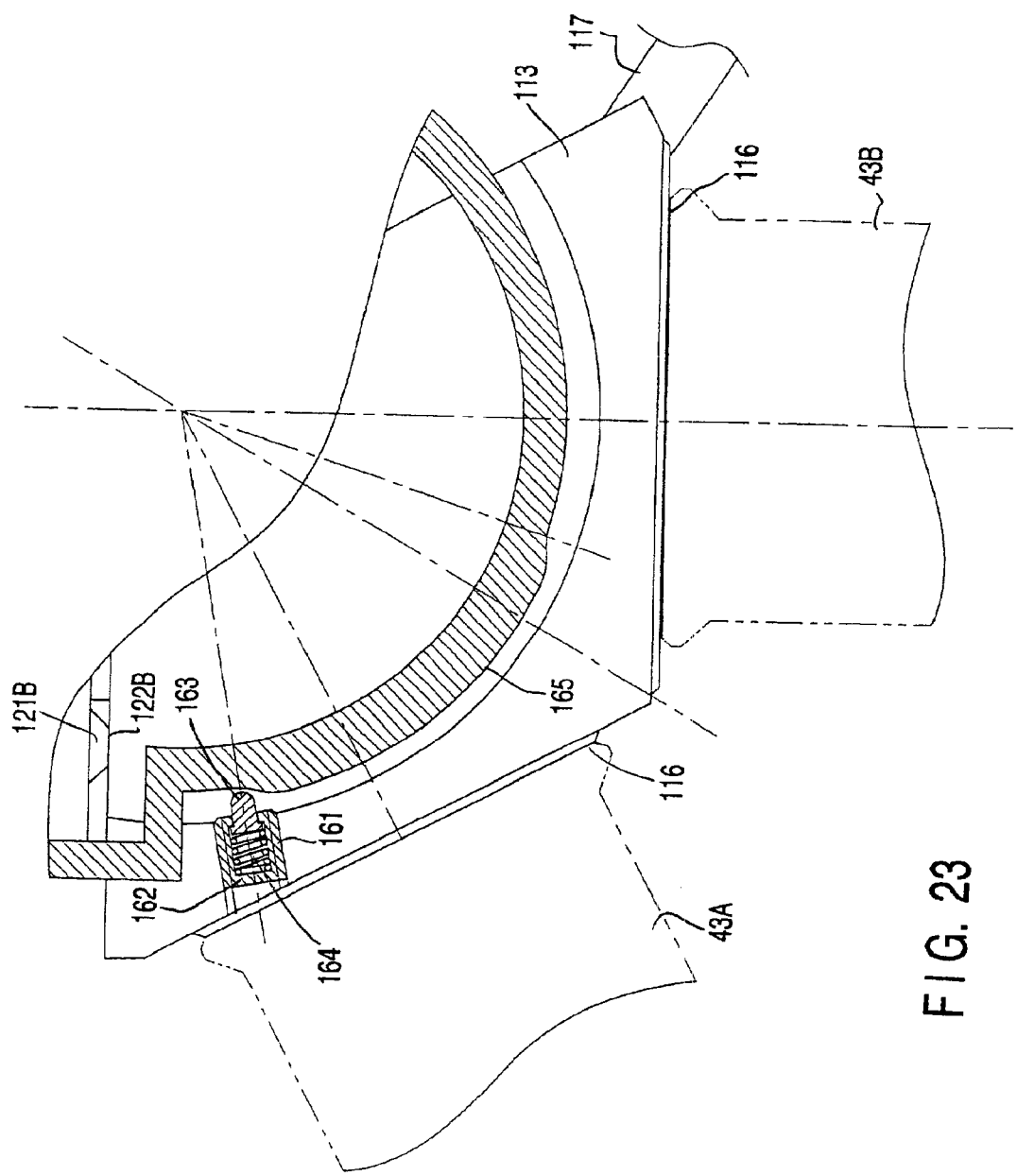
FIG. 23 is a side view showing schematically still other structure of the objective lens switching apparatus in a partially broken state in the microscope shown in FIG. 8.

FIG. 23 is a side sectional view showing schematically the fifth embodiment of the lens switching mechanism of the present invention, indicating the surrounding of the rotation shaft 115 in a partially broken view. FIG. 22 indicates a state in which the objective lens 43A is positioned on the optical axis Z0 of the microscope. In FIG. 23, like reference numerals are attached to the same components as FIGS. 13 to 22 and a description thereof is omitted.

According to the fifth embodiment of the lens switching mechanism, the rotating member 113 is provided with a female screw hole 161 which is directed to the rotation center of the rotating member 113 as well as the objective lens mounting screw hole 116 and a screw 162 is driven into that hole toward the outer face of the fixing member 111 from outside. The inside of the screw 162 contains a cavity and a rounded corner member 163 made of resin or metal is incorporated in the cavity such that it is inserted and slid. A compression spring 164 is included between the bottom of the cavity in the screw 162 and the bottom of the rounded corner member 163. The rounded corner member 163 is provided with a flange portion, which prevents the rounded corner member 163 from being slipped and jumped out of the screw 162 by the compression spring 164.

In a state shown in FIG. 23, the objective lens 43B on the rear side remains positioned, so that a force which presses the restricting member 121 against the contact member 122 is applied by the tension spring 133. If the observer rotates the rotating member 113 by operating the operation lever 117, a rounded corner member 163 comes into contact with an outer circular face 165 gradually because the outer circular face 165 provided on the fixing member 111 has a shape shown in FIG. 23, so that the rounded corner member 163 is pressed by the compression spring 164. Thus, a friction force is generated between the compression spring 164 and the outer circular face 165 or the fixing member 111. Because this friction force is stronger than a force of the tension spring 133 trying to rotate the objective lens 43A and the rotating member 113, the fixing member 111 and the rotating member 113 are held within a rotation stroke in which this friction force is exerted sufficiently. Therefore, even if the hand is released from the operation lever 117, the objective lens 42A and the rotating member 113 can be stopped at that position. As the rotating member 113 is rotated further by operating the operation lever 117, the rounded corner member 163 begins to leave the outer circular face 165 gradually since just before the restricting member 121A on an opposite side strikes the contact member 122A. When the restricting member 121A comes into a firm contact with the contact member 122A, they are separated completely so that there is no holding force. With this condition, the restricting member 121 is pressed against the contact member 122 by a force of the tension spring 133, so that the objective lens 43A is positioned on the optical axis.

The outer circular face 165 has a circular face which is concentric with an arc of the inner face of the rotating member 113 except on both ends of the rotation stroke of the rotating member 113. The surface of the outer circular face 165 departs from the rounded corner member 163 gradually as the rounded corner member 163 approaches both ends of the outer circular face 165, so that it approaches the rotation center of the rotating member 113. Therefore, a change in friction force is generated between the outer circular face 165 and the rounded corner member 163 which advances tracing this face. Because this face changes smoothly, no sudden change of force intensity is generated unlike the click mechanism or no vibration is generated.

As described above, there is not generated a sudden change in force intensity when positioning the objective lens, so that switching operation without any vibration demanded in the manipulation operation can be done easily. Further, because the positioning is performed by bringing the rotating member into a contact with the restricting member, position reproducibility in micron order, demanded in the objective lens switching apparatus can be achieved. Further, the switching operation is simplified because it is carried out only by operating the operation lever. Further, the protrusion of the apparatus to the objective lens switching apparatus can be reduced so that a wide installation space for the micro manipulator can be assured. Further, no special care does not have to be taken in operating the operation lever upon switching operation, and even if the hand is released from the lever during the operation, there is no fear that the objective lens may move naturally.

Further, the configuration of the rotating member is simplified, thereby making it possible to provide a cheap apparatus. Because elasticity of the leaf spring is employed as the friction force, the durability of the apparatus is high. Further, because the system configuration is formed internally, it is highly resistant to dust, dirt and the like.

Further, because fine adjustment of the friction force is possible and the mechanism is simple, a cheaper apparatus can be provided. Because the entire mechanism can be disposed within a small space, the apparatus can be reduced to a compact size.

Meanwhile, a following invention is included in the above described embodiments.

The objective lens switching apparatus of the present invention comprises two fixing side indexes provided on the fixing member and a rotation side index provided on the rotating member, such that these indexes are disposed along the rotation direction of the rotating member and the rotation side index approaches the fixing side indexes on both ends of the rotation range of the rotating member.

Consequently, it can be informed the operator that the rotating member has approached the restricting member.

Thus, by carrying out careful operation since just before the rotating member strikes the restricting member, a further high precision vibration free state can be achieved.

Additional advantages and modifications will readily occur to those skilled in the art. Therefore, the invention in its broader aspects is not limited to the specific details and representative embodiments shown and described herein. Accordingly, various modifications may be made without departing from the sprit or scope of the general inventive concept as defined by the appended claims and their equivalents.

What is claimed is:

1. A microscope having an observation optical axis comprising:
    a frame main body having a base portion;
    an objective lens switching mechanism for switching two objective lenses by rotating relative to said observation optical axis;
    a stage for carrying a specimen;
    an ocular lens for observing a specimen image obtained with one of said objective lenses;
    a rough/fine motion focusing mechanism provided in a rear part of the microscope with respect to said stage for moving said objective lens switching mechanism in a direction of said observation optical axis by one of rough motion and fine motion;
    a first rough motion handle and a first fine motion handle provided near said rough/fine motion focusing mechanism for operating said rough/fine motion focusing mechanism;
    a rough/fine motion focusing operation portion including a second rough motion handle and a second fine motion handle provided near a front end of said base portion for operating said rough/fine motion focusing mechanism;
    a linkage mechanism for linking said rough/fine motion focusing mechanism with said rough/fine motion focusing operation portion; and
    an operation lever for operating said objective lens switching mechanism,
    wherein said rough/fine motion focusing operation portion and said operation lever are disposed on an ocular lens side of the microscope, relative to said observation optical axis.

2. A microscope according to claim 1, wherein said frame main body includes a base extended toward an observation side and said rough/fine motion focusing operation portion is provided on the observation side relative to the base of said microscope.

3. A microscope according to claim 1, wherein said linkage mechanism comprises:
    a first belt applied between a rough motion shaft of said rough/fine motion focusing mechanism and a rough motion shaft of said rough/fine motion focusing operation portion for transmitting a rotation force; and
    a second belt applied between a fine motion shaft of said rough/fine motion focusing mechanism and a fine motion shaft of said rough motion focusing operation portion for transmitting a rotation force.

4. A microscope according to claim 1, where in said rough/fine motion focusing operation portion specifies an interval between one of said objective lenses and said stage, and includes a stopper mechanism which prevents one of said objective lens switching mechanism and the stage from moving so that one of said objective lenses is not located within the specified interval.

5. A microscope according to claim 1, further comprising:

a fixing member;

a rotating member provided rotatably on said fixing member on which said objective lenses are arranged in a circular shape to be rotatable along an arrangement direction thereof;

a restricting member for restricting rotation of said rotating member so as to restrict the rotation of said rotating member when said objective lens is located on said observation optical axis; and applying means for applying a rotation force in an inverse direction larger than a rotation force applied to the rotating body comprised of said rotating member and said objective lens due to gravity depending on a rotation angle of said rotating member.

6. A microscope according to claim 5, wherein said applying means comprises spring fulcrum points provided on each of said fixing member and said rotating member and a tension spring placed between the spring fulcrum points, said spring fulcrum points being disposed at each position across the rotation center of said rotating member.

7. A microscope according to claim 5, wherein:

said rotating member is rotated within a rotation range specified between first and second positions determined by first and second restricting members while the rotation range is comprised of a first and second guide regions for guiding said rotating member to the first and second positions and an intermediate region located between the first and second guide regions, and said applying mechanism includes a rotation preventing mechanism which generates the rotation force in the inverse direction in only the first and second guide regions so as to prevent the rotating body from being rotated with the rotation force in the inverse direction resisting said rotation force in said intermediate region thereby maintaining a state of said rotating member.

8. A microscope according to claim 7, wherein said rotation preventing mechanism includes a spring mechanism for preventing a rotation of said rotating member.

9. A microscope according to claim 7, wherein said rotation preventing mechanism includes a friction mechanism for preventing a rotation of said rotating member.

10. A microscope according to claim 5, wherein said rotating member is rotated within a rotation range specified by said restricting member, said microscope further including a rotation preventing mechanism for applying a predetermined friction force to a rotation of said rotating member in an intermediate region of the rotation range.

11. A microscope according to claim 1, wherein said operation lever is a rod-like lever extended forward, and by operating the operation lever in a vertical direction, said objective lens is switched.

12. A microscope according to claim 1, further comprising supporting legs for supporting a front portion of said stage from below, wherein said rough/fine motion focusing operation portion has an operation portion supporting member for supporting said second rough motion handle and said second fine motion handle rotatably, said operation portion supporting member being fixed on a front end of said base portion, said supporting legs being fixed on said operation portion supporting member.

13. A microscope according to claim 1, wherein a rotation shaft of said first rough motion handle and said first fine motion handle is parallel to a rotation shaft of said second rough motion handle and said second fine motion handle.

* * * * *